United States Patent
Syed et al.

(10) Patent No.: US 9,396,763 B2
(45) Date of Patent: Jul. 19, 2016

(54) COMPUTER-ASSISTED COLLABORATIVE TAGGING OF VIDEO CONTENT FOR INDEXING AND TABLE OF CONTENTS GENERATION

(71) Applicant: ClipMine, Inc., Santa Clara, CA (US)

(72) Inventors: Zia Syed, Sunnyvale, CA (US); Syed Farhan Raza Zaidi, Sunnyvale, CA (US); Saad Ali, San Jose, CA (US); Ivana Savic, San Lorenzo, CA (US); Omar Javed, Secaucus, NJ (US)

(73) Assignee: ClipMine, Inc., Santa Clara, CA (US)

( * ) Notice: Subject to any disclaimer, the term of this patent is extended or adjusted under 35 U.S.C. 154(b) by 155 days.

(21) Appl. No.: 14/542,071

(22) Filed: Nov. 14, 2014

(65) Prior Publication Data

US 2015/0139610 A1    May 21, 2015

Related U.S. Application Data

(60) Provisional application No. 61/904,960, filed on Nov. 15, 2013.

(51) Int. Cl.
*H04N 21/472* (2011.01)
*G11B 27/34* (2006.01)
*H04N 21/475* (2011.01)
*H04N 21/2747* (2011.01)
*G11B 27/11* (2006.01)

(52) U.S. Cl.
CPC ............... *G11B 27/34* (2013.01); *G11B 27/11* (2013.01); *H04N 21/2747* (2013.01); *H04N 21/4758* (2013.01); *H04N 21/47205* (2013.01)

(58) Field of Classification Search
CPC ............ G11B 20/00086; B11B 27/34; H04N 21/47202; H04N 21/474; H04N 21/47205; H04N 21/4758; H04N 21/4826
See application file for complete search history.

(56) References Cited

U.S. PATENT DOCUMENTS

| | | | |
|---|---|---|---|
| 8,229,959 B1* | 7/2012 | Yagnik .............. | G06F 17/30991 707/782 |
| 2008/0178239 A1* | 7/2008 | Yampanis ........... | H04L 41/5064 725/110 |

* cited by examiner

*Primary Examiner* — Huy T Nguyen
(74) *Attorney, Agent, or Firm* — Hamilton, DeSanctis & Cha LLP

(57) ABSTRACT

Methods and systems for generation of an index and Table-of-Contents (ToC) for videos based on user given labels or a combination of user input and automated indexing techniques are provided. According to one embodiment, an annotation tool and a video player are presented to individual subscribers/users of a video discovery and consumption service. Tags proposed by the subscribers to be associated with various portions of the video content are received, processed and integrated within a global ToC for the video. The service can assist subscribers that intend to tag a certain portion of video by automatically proposing suitable tags and portion boundaries. Subscribers can vote on the suitability of tags constituting the ToC. Responsive to a request to view video content, a customized ToC is presented to a subscriber which include labels selected from the global ToC in accordance with default tag selection/filtering criteria or filtering criteria specified by subscriber.

33 Claims, 18 Drawing Sheets

COMPUTER-ASSISTED COLLABORATIVE TAGGING OF VIDEO CONTENT FOR INDEXING AND TABLE OF CONTENTS GENERATION

CROSS-REFERENCE TO RELATED APPLICATIONS

This application claims the benefit of priority to U.S. Provisional Application No. 61/904,960, filed on Nov. 15, 2013, which is hereby incorporated by reference in its entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2013-2014, ClipMine, Inc.

BACKGROUND

1. Field

Embodiments of the present invention generally relate to systems and methods for discovering and consuming video content, including annotating, organizing, searching, indexing and sharing information about such content. In particular, embodiments of the present invention relate to generation of a table of contents and/or an index for video content based on user-generated and/or automatically extracted labels.

2. Description of the Related Art

In recent years, digital distribution of videos and their viewing on devices connected to a network has become common. Videos include recordings, reproduction or broadcasting of moving visual images that may contain sound and/or music. Videos may contain a variety of content that may be for entertainment, informational or educational purposes. There are various limitations associated with the current video discovery and consumption experience provided by existing video players that frustrate viewers. For example, existing online videos are not accompanied by a table of contents (ToC) or an index that allows a viewer to directly jump to a segment of interest within the video. Therefore, the conventional approach of viewing online videos is that the users either have to watch the video from the start to the end or by randomly moving forward in the video by using video controls (e.g., fast forward, rewind, etc.) of the video player. The video player is typically software that can play multiple video file formats, such as Audio Video Interleave (AVI), Moving Picture Experts Group (MPEG)-4 (MP4), Apple QuickTime Movies (e.g., a MOV file) and so forth. The video players can be implemented in various programming languages, including, but not limited to, Adobe Flash, C++, Java, JavaScript, Python or a version of HyperText Markup Language (HTML), such as HTML5.

Furthermore, at present, when watching an online video, users have no way to communicate and/or keep track of facts, opinions, and/or emotions about specific content and/or moments within the video. Tools, such as YouTube, allow users to consume video content but only to share information, in the form of comments, about the video as a whole.

While the concept of bookmarking exists with books, there is no useful tool that allows users to "bookmark" moments in videos and share these moments with others. In addition, there is no existing tool that allows users to skim through the video by skipping the boring parts. It is the lack of the abilities to search, scan, and skim through the videos that cause users to stop watching an entire video.

One way the users get around this today is by randomly seeking ahead to the content they want by using the video controls. This may end up being an unsatisfying experience based on trial and error and meanwhile there is no guarantee that the users will find what they are looking for. Other ways include leveraging annotations manually added by the user who uploaded the video and searching through the closed captions or subtitles on content websites where these features are available e.g., YouTube. Both of these methods are unreliable, as the vast majority of the users uploading videos don't add annotations to help their viewers and very few videos have closed captions available.

The automatic transcription services offered by sites like YouTube also suffer from poor audio to text quality unless the input audio is free of noise and there is a single person talking. Lastly, all the methods based on keyword based search suffer from a broader problem that they can't differentiate between a mere mention of a keyword in the video versus an authoritative section that talks about the high level concept described by the keyword in detail. It is the result of the shortcoming of these available methods for search today that the users end up recording the exact times within the video where interesting moments occur and may share those with others through discussion forums, email messages, or social networks.

The current lack of structural information within the videos also adversely affects the ability to do a meaningful search across the videos. When users search for videos, they are currently provided with results that are based on the indexing of video titles, subtitles or keywords etc. For example, if a user searches for "binary trees" they might be provided with video results that have one or both of the words "binary" and "trees" in the title of the video. A longer video that has some valuable information on binary trees but mostly covers other topics might not be discoverable by the user because the title and metadata may not contain the words binary tree and therefore will not match the user query. It would be desirable to enable users to locate and label useful video segments from within the larger video, and make these labels search-able for other users.

With the increasing use of social networking and photo-sharing sites, users are becoming more familiar with the concept of liking or disliking content and also the tagging of content, e.g., providing the name of a person in a photograph on a photo sharing site, etc. Many existing social media applications do have like/dislike labels for the whole video, however, they do not give the user the option to view a ToC of a video or label a segment of the video. It would be desirable to enhance users' video discovery and consumption experience by, integrating labels from multiple users (and optionally also from automatic video indexing methods) to create a consistent and interactive ToC for videos, thereby allowing viewers to easily identify and jump to segments of interest within videos.

SUMMARY

Methods and systems are described for generation of an index for video content based on crowd-sourced input or a combination of subscriber input and one or more automated indexing techniques. According to one embodiment, an annotation tool is presented to a first subscriber of a network-based video discovery and consumption service as video content is being consumed by the first subscriber. A first proposed label to be associated with a first portion of the video content is received by the annotation tool from the first subscriber. The first proposed label is incorporated within a global table of contents (ToC) for the video content by storing within a database maintained by the network-based video discovery and consumption service and associating with the video content the first proposed label and a start time of the first portion of the video content. The annotation tool is presented to a second subscriber of the network-based video discovery and consumption service as the video content is being consumed by the second subscriber. A second proposed label to be associated with the first portion of the video content or a second portion of the video content is received by the annotation tool from the second subscriber. The second proposed label is incorporated within the global ToC by storing within the database and associating with the video content the second proposed label. A customized ToC of the video content including multiple ToC objects is presented to a third subscriber of the network-based video discovery and consumption service responsive to a request from the third subscriber to view the video content. Each ToC object represents a user interface element including a label selected for inclusion within the customized ToC from proposed labels within the global ToC in accordance with default filtering criteria or filtering criteria specified by the third subscriber. The ToC objects include at least one ToC object corresponding to the first proposed label or the second proposed label.

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Figure 1:
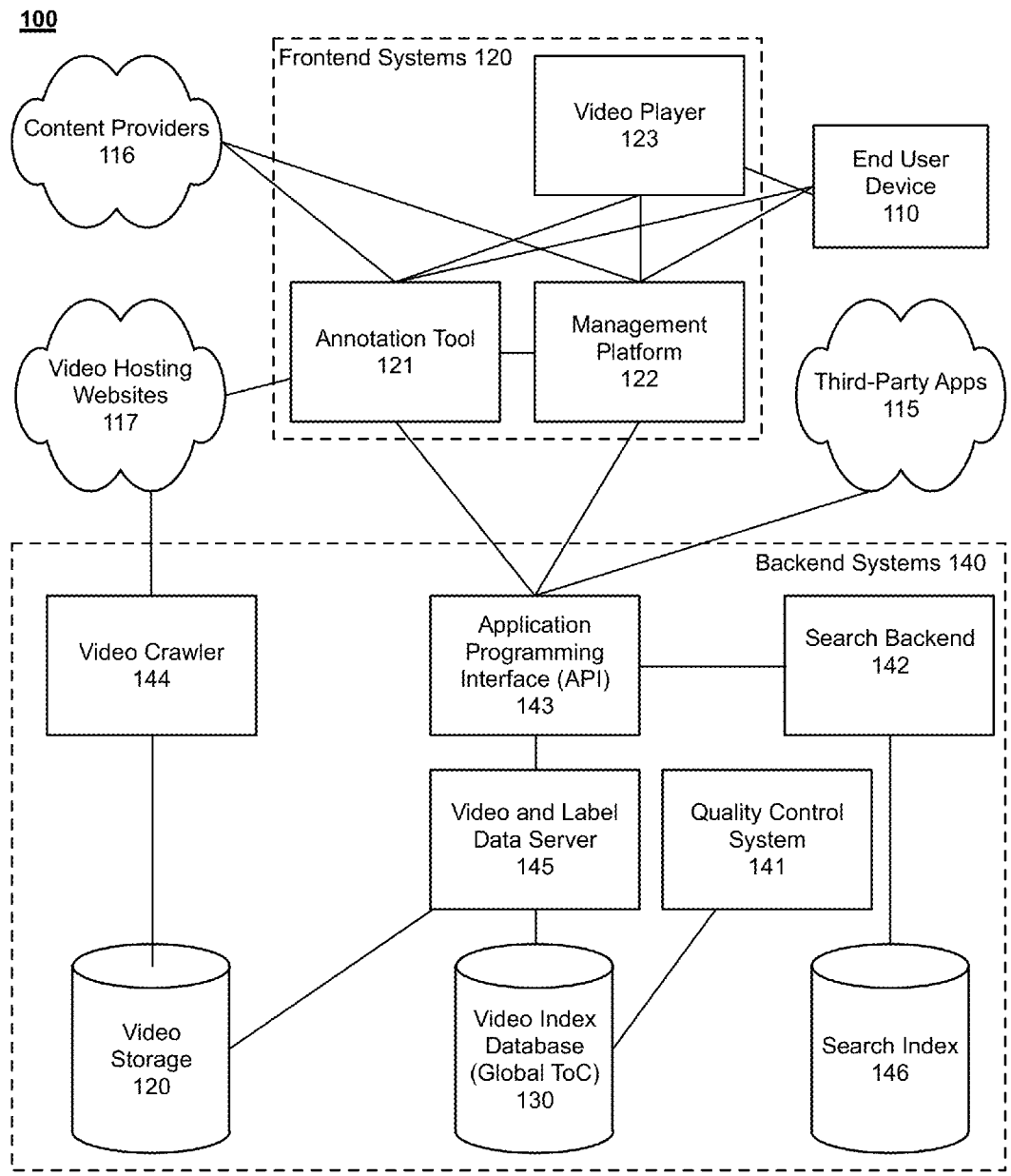
FIG. 1 is a block diagram illustrating frontend systems and backend systems of a video consumption and discovery service and interactions with external systems in accordance with an embodiment of the present invention.

Methods and systems are described for generation of an index for video content based on user input (e.g., crowd-sourced input) or a combination of user input and one or more automated indexing techniques. According to embodiments of the present invention, a video is displayed to a user (e.g., a subscriber) of a video consumption and discovery service via a video player running within a web browser, for example, of a client device (e.g., a desktop computer system, a smartphone, a laptop computer or a tablet computer) of the user. Concurrently with the presentation of the video, an associated table of contents (ToC), if available, may also be displayed to the user. The ToC may be displayed within a separate annotation tool or may be integrated within the video player. The annotation tool (either integrated within the video player or separate) allows users to specify content and placement of a label or tag (e.g., a short description of a video segment) within a video while watching the video. The users can also rate various entries of the current ToC as useful or not and/or propose edits to same. The video consumption and discovery service may then integrate proposed labels received from all viewers as well as label ratings to update/generate the ToC for a particular video by automatically resolving conflicting labels, removing low rated labels and/or combining similar labels. In addition, the system may incorporate within the ToC automatically generated video labels with the user-generated labels in the integration process. The ToC may be updated continually based on user feedback/responses (e.g., ratings, likes, dislikes of existing labels, proposed revisions to existing labels and proposed new labels), thereby ensuring that the most useful and/or popular video segments/clips are represented in the ToC and the (searchable) video index.

In the following description, numerous specific details are set forth in order to provide a thorough understanding of embodiments of the present invention. It will be apparent, however, to one skilled in the art that embodiments of the present invention may be practiced without some of these specific details. In other instances, well-known structures and devices are shown in block diagram form.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, the steps may be performed by a combination of hardware, software, firmware and/or by human operators.

Embodiments of the present invention may be provided as a computer program product, which may include a machine-readable medium having stored thereon instructions, which may be used to program a computer (or other electronic devices) to perform a process. The machine-readable medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments of the present invention may also be downloaded as a computer program product, wherein the program may be transferred from a remote computer to a requesting computer by way of data signals embodied in a carrier wave or other propagation medium via a communication link (e.g., a modem or network connection).

While in various embodiments of the present invention are described in the context of desktop computer systems, laptop computers, tablet computers, smartphones and their associated web browsers and video players presented therein, the methodologies described herein are equally applicable to plug-ins or extensions to web browsers, web applications, mobile applications and tablet applications. Furthermore, the end user devices may include television (TV) sets. As such, those skilled in the art will appreciate the annotation and ToC functionality described herein may be presented within a TV app or a media player provided by video streaming services (e.g., Netflix or Hulu).

Brief definitions of terms used throughout this application are given below.

The term "annotation" broadly refers to user-supplied or automatically generated content that is associated with a portion of video content or a video "clip" (e.g., one or more frames of video content corresponding to a particular time or period of time within a video). Depending upon the particular implementation, annotations may include, but are not limited to, one or more of labels, tags, comments and additional content. As discussed further below, labels may be text-based and may include one to a few words or may be longer to be more descriptive of a particular moment or moments in a video. In some embodiments, a tag or a label may be in the form of a hash tag that is similar to hash tags on Twitter. Labels or tags may also have a description. Labels and tags may include facts that are descriptive of the content associated with a portion of video content or within a clip and/or emotional tags representative of a user's emotional reaction to the portion of video content or about something that happened within the portion of video content. An example of an emotional tag is "I love this!". An emotional tag can also be in the form of an icon (e.g., an emoticon). Emotions may be associated with an annotation and may be a stored/noted property. In addition, users may be able to attach emotions/ reactions (e.g., funny, outrageous, crazy, like, dislike) to existing annotations or other parts of videos. Facts may represent stored/noted properties of an annotation and may be limited to describe the annotation using terminology used in the video and/or external repositories (e.g., Wikipedia). Comments may include text and may be questions or opinions provided by a user. The context of a comment can be emotional and the video consumption and discovery system may also provide various sets of emoticons from which the user can select. Users may also be provided with the ability to associate various types of content and data with an annotation, including, but not limited to, hyperlinks, images and files. In some embodiments, annotations may also be linked to other annotations from the same or different videos. This linking may be manually defined by users and/or automatically determined by the video consumption and discovery service based on user provided data.

The terms "connected" or "coupled" and related terms are used in an operational sense and are not necessarily limited to a direct connection or coupling.

The term "client" generally refers to an application, program, process or device in a client/server relationship that requests information or services from another program, process or device (a server) on a network. Importantly, the terms "client" and "server" are relative since an application may be a client to one application but a server to another.

The term "clip" generally refers to a continuous portion or segment of a video having a start time and an end time. A clip may have one or more annotations associated therewith. In some embodiments, users may modify the start and/or end time of the clip. In one embodiment, clips may be shared with other users and a clip can be part of a playlist.

The phrases "in one embodiment," "according to one embodiment," and the like generally mean the particular feature, structure, or characteristic following the phrase is included in at least one embodiment of the present invention, and may be included in more than one embodiment of the present invention. Importantly, such phases do not necessarily refer to the same embodiment.

The term "label" generally refers to a type of an annotation comprising a set of one or more of text-based characters (e.g., American Standard Code for Information Interchange (ASCII) characters, alphanumeric characters, non-alphanumeric characters and characters representing the alphabet of various languages in various fonts and/or sizes), text symbols (e.g., ♡, ☘, ☆, ♪, ☺, ❀, ¶, ✿, ☼, 💬, ☞, ✈, etc.), emoji, ideograms, smileys, icons or other visually perceptible information that is associated with a portion of video content (e.g., one or more frames of video content corresponding to a particular time or period of time within a video) or a clip. Depending upon the particular implementation, the label may include one or more words and/or be in the form of one or more hash tags (e.g., hash tags similar to those used in the context of Twitter). A label or proposed/suggested label may be user-generated or automatically generated based upon contextual analysis, for example, of the portion of video content at issue. Labels may represent content or descriptive information about the particular portion of video content and/or may include emotional tags, for example, representing a user's emotion or reaction to or about something within the particular portion of video content.

If the specification states a component or feature "may", "can", "could", or "might" be included or have a characteristic, that particular component or feature is not required to be included or have the characteristic.

The term "playlist" generally refers to a set of associated clips. A playlist may be represented in the form of a list of clips that are arranged in an order specified by a user. Users can create playlists from clips from one video or across multiple videos. In embodiments of the present invention, playlists can be shared with other users (e.g., members or subscribers) of a video consumption and discovery system. In some embodiments, playlists can be shared with users outside of the video consumption and discovery system, thereby allowing these users to view the shared playlists on partner websites. In embodiments of the present invention, clips may be presented to users in the form of ToC objects or hyperlinks within a ToC. For example, the video consumption and discovery service may present the user with a hyperlink for each clip in a playlist that allows the user to skip to the clips they wish to view by selecting the corresponding hyperlinks.

Alternatively, the user may view the playlist in the order arranged by the user sharing the playlist.

The term "responsive" includes completely or partially responsive.

The term "server" generally refers to an application, program, process or device in a client/server relationship that responds to requests for information or services by another program, process or device on a network. The term "server" also encompasses software that makes the act of serving information or providing services possible.

The term "site," "website," "third-party website" and the like generally refer to an online-accessible application that allows users to view videos. Non-limiting examples of sites include YouTube, Coursera, Udacity, Vimeo, Hulu and Voodoo. Sites may be vertical specific. For example, a site may focus only on educational content. Meanwhile other sites, such as YouTube, may have videos about different things.

The term "user" generally refers to an individual having access to any part of a video consumption and discovery service. In one embodiment, users can sign up for an account with the video consumption and discovery service and become a member or subscriber by using a third-party social media account (e.g., a Facebook, Twitter or Google plus account). In embodiments of the present invention, users provide content (e.g., proposed labels, annotations, likes/dislikes) that are saved by the video consumption and discovery service by using an annotation tool and/or a management platform. There may be various types and/or groups of users (e.g., administrators, moderators of content, basic members and users with privileged status, such as editors or super-users).

FIG. 1 is a block diagram illustrating frontend systems 120 and backend systems of a video consumption and discovery service 100 and interactions with external systems 140 in accordance with an embodiment of the present invention. In the context of the present example, video discovery and consumption service 100 includes frontend systems 120 and backend systems 140. Frontend systems 120 generally include functional modules with which users (e.g., subscribers of video discovery and consumption service) interact and through which they view videos and backend systems 140 generally include functional modules with which users do not have direct interactions and/or background or batch processing. As shown in FIG. 1, frontend systems 120 may interact with content providers 116 and video hosting websites 117. Additionally, third-party apps 115 may be provided with access to functionality implemented by backend systems 140.

According to one embodiment, backend systems 140 comprise several sub components including an application programming interface (API) 143, a video storage database 120, a video index database 130, a search backend 142, a search index 142, a quality control system 141, a video and label data server 145 and a video crawler 144.

API 143 is an interface to backend systems 140 provided to video player 123, management platform 122 and annotation tool 121 that allows access to storage, retrieval and/or search functionality. For example, API 143 may provide methods to retrieve information, such as information regarding users, videos, annotations/labels, video clips and playlists. In one embodiment, API 143 is implemented as a web-based Representation State Transfer (REST) application. REST is a type of API implementation in which calls to it are made over the HyperText Transfer Protocol (HTTP) or HTTP Secure (HTTPS) protocol. Depending upon the particular implementation, third-party apps 115 may also communicate with API 143 to save, retrieve and/or search data within video storage 120, video index database 130, search index 146 and/or other databases that may be used by backend systems 140.

Search backend 142 provides an API that allows other parts of video consumption and discovery service 100 and potentially other external entities to perform a search query and to retrieve results based on data stored within backend systems 140. In one embodiment, search backend 142 is implemented using the Elastic Search tool. Elastic Search is an open source tool that allows for indexing and searching for content. Data, such as videos, clips, user information, may be indexed by search backend 142 and stored within search index 146. As discussed in further detail below, a unique relevance algorithm is implemented in accordance with embodiments of the present invention that uses various automated generated data, data input by users and data regarding users, annotations/labels, videos, clips and/or other data to rank search results and/or filter entries of a ToC for presentation to users.

Quality control system 141 may be used to identifier and/or filter data provided by users, such as annotations and labels, that may be irrelevant to the context of a video and that may represent spam. In one embodiment, quality control system 141 is used to enforce and maintain the quality of data within video consumption and discovery service 100 and to filter out low quality and/or unwanted data (e.g., advertising messages, inappropriate words/messages or other bad data) provided by users. In some embodiments, quality control system 141 is completely isolated to backend systems 140 and is responsible for determining whether particular user-generated content is spam. The methodology for determining spam may be based on training quality control system 141 by providing it content that is known to be spam and content that is known not to be spam. Based on this information, quality control system 141 can then recommend, to a degree, new content, that is likely to be spam. In other embodiments, quality control system 141 may incorporate information provided by certain types of members (e.g., moderators) of the video consumption and discovery service 100 that have the ability to flag annotations, labels, clips, playlists, or other content as spam.

In one embodiment, video crawler 144 is used to search video hosting websites 4170 (e.g., YouTube, Coursera, Vimeo, DailyMotion, Vine) for videos to add to backend systems 140 to index and to perform automated content analysis. Content retrieved by video crawler 144 may be stored in video storage 120 and may be processed by video and label data server 145. Exemplary functional modules of video label and data server 145 are described further below with reference to FIG. 2.

As discussed further below, in addition to storing information regarding videos, playlists, clips and annotations, including, for example, a global ToC (e.g., all user-proposed labels and automatically generated labels), video index database 130 may also store information regarding users (e.g., groups with which the user is associated, a user ID, email address, reputation, voting history, labels created, etc.). Depending upon the particular implementation, fewer or additional functional modules may be included within backend systems 140.

According to one embodiment, frontend systems 120 include three subsystems, an annotation tool 121, a management platform 122 and a video player 123. Annotation tool 121 and management platform 122 may be separate or integrated as part of the same system. For example, management platform 122 could be implemented in the cloud, whereas annotation tool could be implemented locally on an end user device 110 that is playing the video via video player 123, or in the cloud, separate from or together with management platform 122 and backend systems 140. In some implementations, it is envisioned that annotation tool 121m management platform 122 and/or video player 123 will be integrated with devices, such as Internet boxes, Google Chromecast, Amazon Fire TV, Roku and/or Apple TV. In at least one embodiment, the entire platform is implemented using one or more computer systems, an example of which is described below with reference to FIG. 16.

In one embodiment, annotation tool 121 is presented to users of client devices (e.g., end user device 110) while they are watching a video and allows users to communicate facts, opinions and/or emotions, collectively referred to herein as annotations, about specific moments, portions or segments of a video. Annotation tool 121 allows users to contribute to an index or a ToC of the content within a video. Annotation tool 121 may also allow users to share the resulting labeled video content and/or customized walk-throughs relating thereto with others on social platforms, such as Twitter, Facebook, LinkedIn and Google Plus. Annotation tool 121 allows users to selectively view annotations or labels they have created, those created by other users and/or those automatically generated by video consumption and discovery service 100. In some embodiments, annotation tool allows for crowd sourced generation of a ToC for video content by way of collaborative editing of annotations and labels proposed by users of video consumption and discovery service 100. For example, all users may be editing the same version of the annotations and labels rather than simply having the ability to edit their own.

As described in further detail below, in some embodiments, annotation tool 121 presents the user with a text input box that allows the user to enter a new annotation or label. Furthermore, in some embodiments, the user is allowed to drag an annotation or label relative to a progress time bar associated with the video in order to set a new start time.

As discussed below, annotation tool 121 may also provide users with the ability to search for and/or filter annotations and/or labels associated with a video by presenting a search text input box to the user. In one embodiment, the search is real-time allowing the users to see matching results as they type their search query.

According to one embodiment, annotation tool 121 is implemented in the form of a web browser extension, which once installed appears on supported or participating video hosting websites 117 next to a video during video consumption and allows the user to both contribute content (e.g., annotations, labels, likes/dislikes) and view content provided by other users. In one embodiment, the web browser extension is specifically configured for the Google Chrome web browser. In other embodiments, annotation tool 121 may be part of a proprietary Adobe Flash player or HTML5 player. Annotation tool 121 may alternatively be implemented as a web application, a mobile application or a tablet application.

In some embodiments, annotation tool 120 has full control of video player 123. For example, annotation tool 121 may be able to start, stop, and pause video player 123. Annotation tool 121 may also be able to seek to a specific time of the current video, get the duration of the currently video, and obtain and present other data about the video. Events, such as start, stop, pause, change of video, which are triggered by video player 123 may also be handled by annotation tool 121. In some embodiments, annotation tool 121 may control video player 123 by making calls to an API (e.g., a JavaScript API) in order to control video player 123. In some embodiments, annotation tool 121, can detect, via an adapter, for example, where videos are located in content on video hosting websites 117 and insert itself below one or more of the videos in real-time when the website is displayed to a user. An adapter may be proprietary software code that is part of annotation tool 121 and are made to work and interact with one or more videos on a particular video hosting website of video hosting websites 117. For example, depending upon the particular implementation, one adapter may be configured for use with video hosting websites 117 (e.g., YouTube, Coursera, Vimeo, DailyMotion and Vine).

According to one embodiment of the present invention, in which annotation tool 121 is implemented by independent from the video hosting site at issue, responsive to detecting a video within a website being displayed by end user device 110, annotation tool 121 connects with API 143 to check and retrieve existing annotations and/or labels associated with the video. If there is no reference to the video in video index database 130, API 143 creates a new record in video index database 130 and associates any new annotations and/or labels for that video with that record. In other embodiments, annotation tool 121 does not interact with third-party video hosting websites and works only with videos on the system owner's platform. In one embodiment, annotation tool 121 is embeddable by content owners of third-party websites (e.g., educational learning platforms). This enables content owners to have a customized version of annotation tool 121 specific for their needs.

When there is a high concentration of annotations in a certain area of a video, the annotation tool 121 may present the user with a magnification tool that allows the user to zoom into a specific area of the video timeline or progress time bar in order to see more detail on the specific annotations that are concentrated in that area. In some embodiments, the user may hover over the specific area using a mouse, for example, of a computing device to activate the zooming functionality.

As discussed in further detail below, in some embodiments, annotation tool 121, filters the global ToC and displays ToC objects (e.g., interactive graphical user interface elements) corresponding to ToC entries (e.g., labels/tags) of the global ToC meeting certain filtering and/or rating criteria. For example, only ToC objects corresponding to the top rated labels within the global ToC may be displayed to a user when video consumption starts. Some embodiments allow the user to filter annotations by the type of user that provided it. For example, users can filter by themselves, everyone, friends, those automatically generated by the service provider and so forth. If the zoom control is used, the list of top labels may only be relevant to the zoomed in area but still subject to any existing filter.

In some embodiments, if there is a high concentration of labels associated with a predetermined or configurable timeframe within a video, video and label data server 145 may also cluster these labels into one parent label. Clustering may be based on various factors, including, but not limited to, one or more of the time offset and similarity of content of the labels at issue and properties of the underlying scenes within the video.

According to one embodiment, users may be assigned a reputation score or value based on the quality of labels they have contributed to video consumption and discovery service 100. Users are able to provide feedback regarding labels that other users have contributed by up/down voting or liking labels. As described further below, in one embodiment, the result of other users' feedback can be used as part of the reputation score calculation. For example, up/down voting a particular label may affect the reputation score of the user that contributed/proposed the particular label by increasing/decreasing it. In some embodiments, reputations of users that have contributed labels to a video are used to determine relevance of a video and/or clip to another user performing a search across videos.

Referring now to management platform 122, like annotation tool 121, it may be implemented as a web application, a mobile application or a tablet application. Depending upon the particular implementation, management platform 122 functionality may reside at least in part within one or more of an end user device (e.g., a television), a set-top box, a web browser extension, the cloud, a TV app and media players (e.g., Google Chromecast and Hulu). Management platform 122 may allow users to view their video libraries, clips they have created and activities they have performed. In some embodiments, management platform 122 incorporates social networking features, thereby allowing users to, among other things, follow other users, share clips with other users, view activities of users they follow and/or comment on such activities.

In some embodiments, a user does not need an account to view clips, annotations, and playlists. A user with an account with video consumption and discovery service, herein referred to as a member or a subscriber, may be provide with access to additional features (e.g., a clip library and/or other information relevant to them). There may be various types and/or groups of members/subscribers (e.g., administrators, moderators of content, and basic members).

In order to support member/subscriber related services, management platform may present non-member users with a sign-up screen that prompts users for credentials and allows the users to sign up to be a member of video consumption and discovery service 100. A login screen may be presented to members and allows the user to access video consumption and discovery service 100 if they provide valid credentials. In some embodiments, the login screen may provide users with options to log in via accounts they already have with a partner social network (e.g., Facebook, Twitter, LinkedIn and Google Plus).

Management platform 122 may also allow users to search across their videos and across all videos indexed by backend systems 140 by submitting search requests to backend systems and retrieving results via API 143 and presenting the results to the user.

Various aspects and functions described herein may be implemented as specialized hardware or software components executing on one or more computer systems. There are many examples of computer systems that are currently in use and which may be used for various aspects of the present invention. Non-limiting examples include network appliances, personal computers, workstations, mainframes, networked clients, servers, media servers, application servers, database servers and web servers. Other examples of computer systems may include mobile computing devices (e.g., smartphones, tablet computers and personal digital assistants) and network equipment (e.g., load balancers, routers and switches). Further, functionality may be implemented on a single computer system or may be distributed among multiple computer systems connected to one or more communications networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Consequently, while a limited number of embodiments are described herein for sake of brevity, these examples are not limited to the functionality described being performed on any particular system or group of systems. Further, aspects and functions may be implemented in software, hardware or firmware, or any combination thereof. Thus, aspects and functions may be implemented within methods, acts, systems, system elements and components using a variety of hardware and software configurations, and the examples provided herein are not limited to any particular distributed architecture, network or communication protocol.

Figure 2:
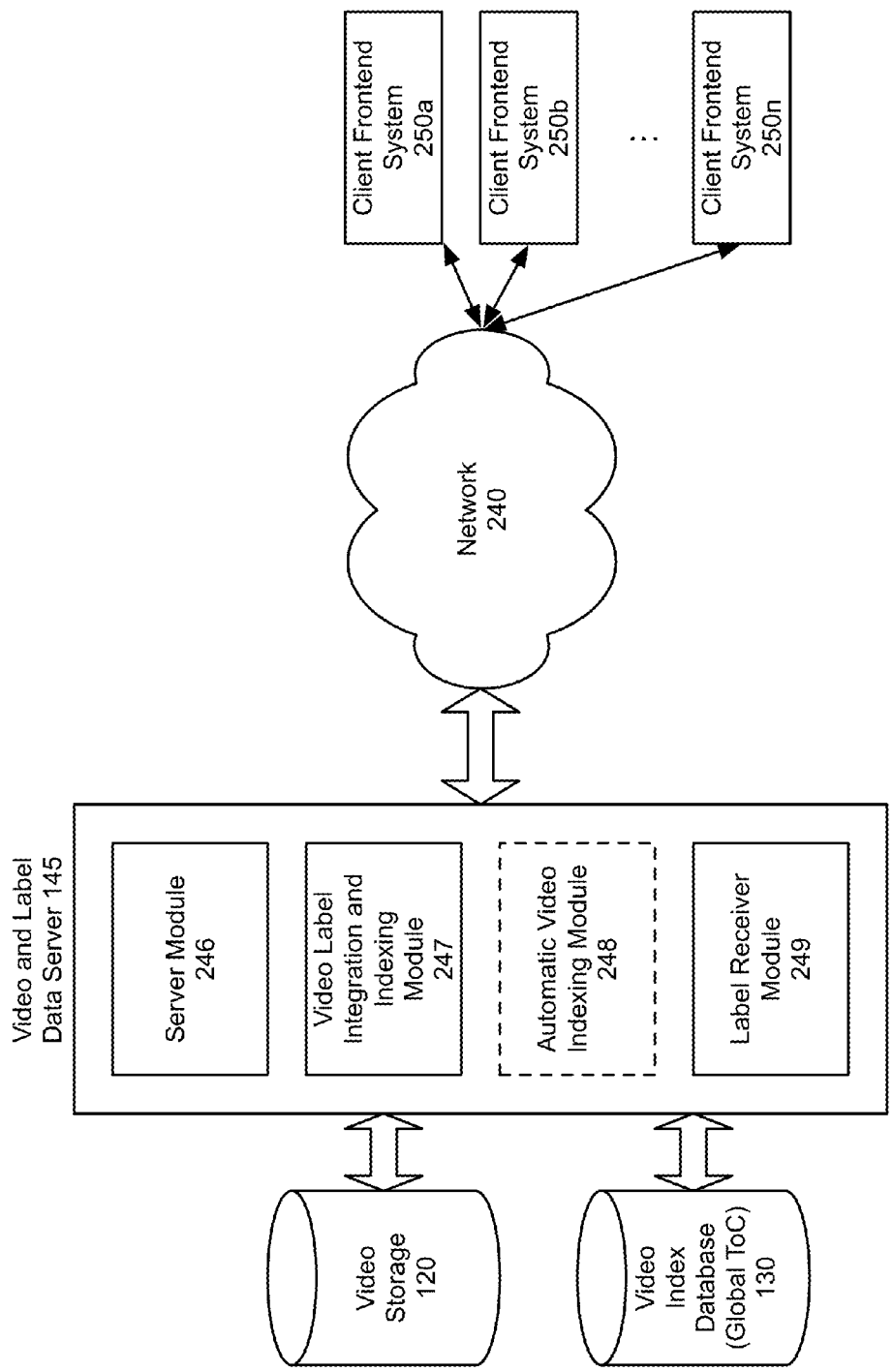
FIG. 2 is a block diagram illustrating various functional modules of a video label and data server logically interposed between video databases and client video players in accordance with an embodiment of the present invention.

FIG. 2 is a block diagram illustrating various functional modules of a video label and data server 145 logically interposed between video databases 120 and 130 and client frontend systems 250*a-n* (e.g., video players, such as video player 123) in accordance with an embodiment of the present invention. In the context of the present example, video label and data server 145 is accessible to client frontend systems 250*a-n* (which are running on end user devices, such as end user device 110) via a network 240 (e.g., the Internet, a private network or other public network). Video label and data server 145 includes a server module 246, a video label integration and indexing module 247, an optional automatic video indexing module 248 and a label receiver module 248. Video label and data server 145 supports multiple clients, which can request to view videos stored within video storage 120 via their respective client applications (e.g., client frontend systems 250*a-n*). Video storage 120 and video index database 130 may make use of a variety of digital media as may be appropriate for the particular implementation. Non-limiting examples of digital media that may be used include one or more hard disk drives, solid-state drives and optical disks.

When the client requests a video, server module 246 sends the requested video and any existing video ToC data (potentially filtered, clustered and/or prioritized as described further below) from video index database 130 to the requesting client video player. The client video player displays the video and ToC to the user. The client video player (assuming an annotation tool, e.g., annotation tool 121, is integrated therewith) also allows the user to add labels to the video or provide an approval/disapproval vote with respect to an existing label.

Any label added or vote cast by the viewer is sent to label receiver module 249. The labels collected by label receiver module 249 are sent to video label integration and indexing module 247. Exemplary automated label integration/filtering processing that may be performed by video label integration and indexing module 247 is described further below with reference to FIG. 9.

According to one embodiment, video consumption and discover service 100 may also automatically generate labels for videos via automatic video indexing module 248. Several automatic video indexing methods exist that can detect activity happening within a video (see, e.g., P. Turaga, R. Chellappa, V. Subrahmanian, O. Udrea, "Machine Recognition of Human Activities: A Survey," *Circuits and Systems for Video Technology, IEEE Transactions on*, vol. 18, no. 11, pp. 1473-1488, November 2008, which is hereby incorporated by reference in its entirety for all purposes), the objects in a video, and the shots in a video (see, e.g., (i) P. van Beek, I, Sezan, D. Ponceleon, A. Amir "Content description for efficient video navigation, browsing and personalization," IEEE Workshop on Content-based Access of Image and Video Libraries, 2000; and (ii) H. Weiming, X. Nianhua, L. Li, Z. Xianglin, S. Maybank, "A Survey on Visual Content-Based Video Indexing and Retrieval," *Systems, Man, and Cybernetics, Part C: Applications and Reviews, IEEE Transactions on*, vol. 41, no. 6, pp. 797-819, November 2011, both of which are hereby incorporated by reference in their entirety for all purposes), and thus potentially can be used to produce data to support automated label generation. The automatically generated labels are also sent to video label integration and indexing module 247, which prunes and integrates the labels proposed by users and those generated by automatic algorithms into a consistent ToC, information associated with which can be stored in video index database 130. According to one embodiment, video label integration and indexing module 247 continually updates the ToC for a particular video as label receiver module receives input from the users. Various approaches for performing the pruning/filtering and integration of labels are described in further detail below.

In some embodiments, automatic video indexing module 248 may be used to facilitate analysis, transcription, categorization of videos, and automated annotation generation. Automatic video indexing module 248 may be used to detect key moments and objects in a video (e.g., faces, scenes, objects, sentiments and shot detection). Based on this data, automatic video indexing module 248 may generate an initial set of annotations for each video within video storage 120.

Returning to the integration process, depending upon the particular implementation, it can take a variety of forms including, but not limited to:

Simple integration: Chronological listing of all available labels for a particular video and creation of a ToC based on those labels.

Manual integration: One or more users are given privileges as editors or super-users and are enabled to allow or disallow labels to become part of the ToC for a particular video. According to one embodiment, users may be granted privileges based on their user reputation score or status. A user's status can potentially be elevated based on approvals of annotation by other users, number of annotations added, number of edits made and the like.

Automatic (intelligent) label integration: Automatic label integration uses cues, including, but not limited to, semantic distance between labels, time alignment between labels, number of approval votes for labels, reputations of users providing labels, similarity of label with underlying video content, to cluster together similar labels. Then, representative labels in prominent clusters may be selected for generating the video ToC. Exemplary automatic label integration/filtering processing is described further below with reference to FIG. 9.

Combined manual and automatic label integration: This integration process uses automatic label integration to generate the ToC but also allows users with privileged status to add, remove or modify the labels in the ToC.

Figure 3A:
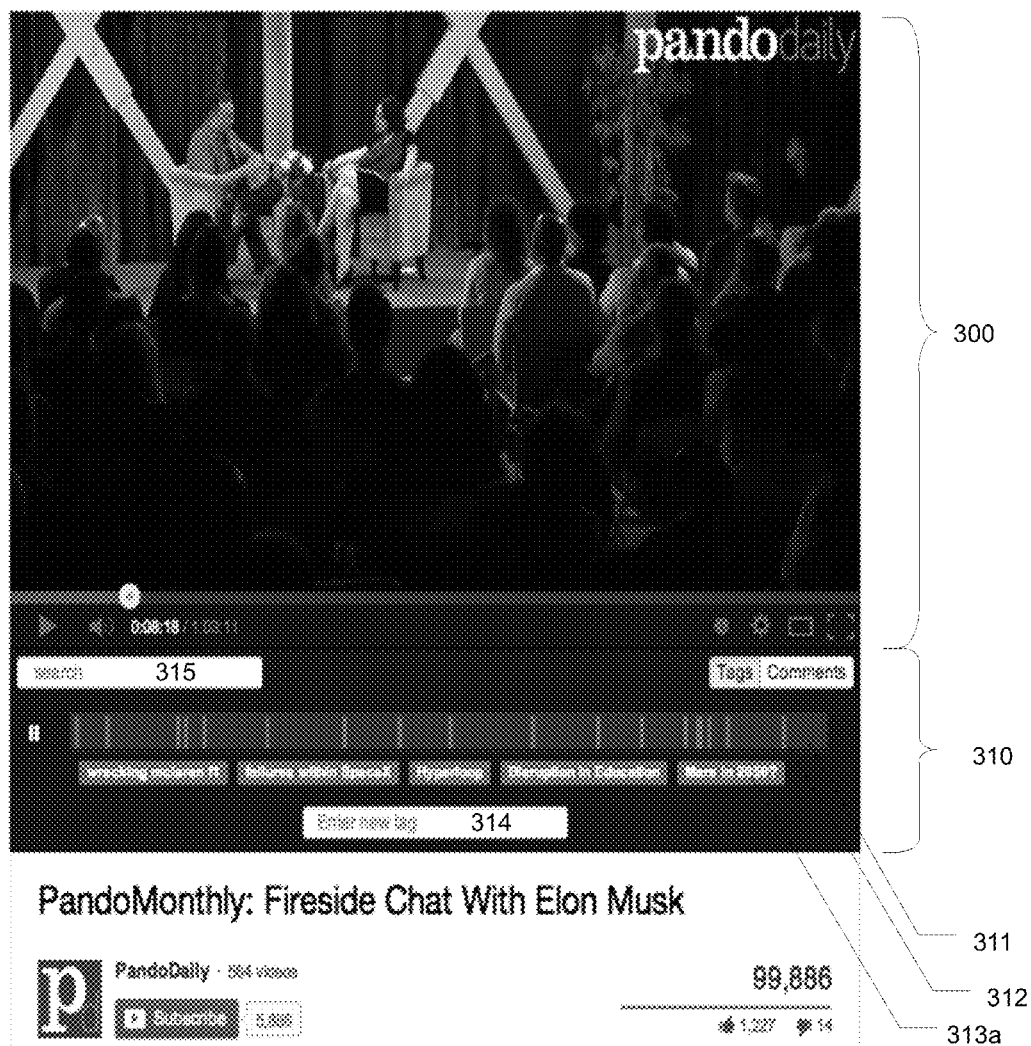
FIGS. 3A-B illustrate a video player, an annotation tool and a table of contents for a video in accordance with an embodiment of the present invention.
Figure 3B:
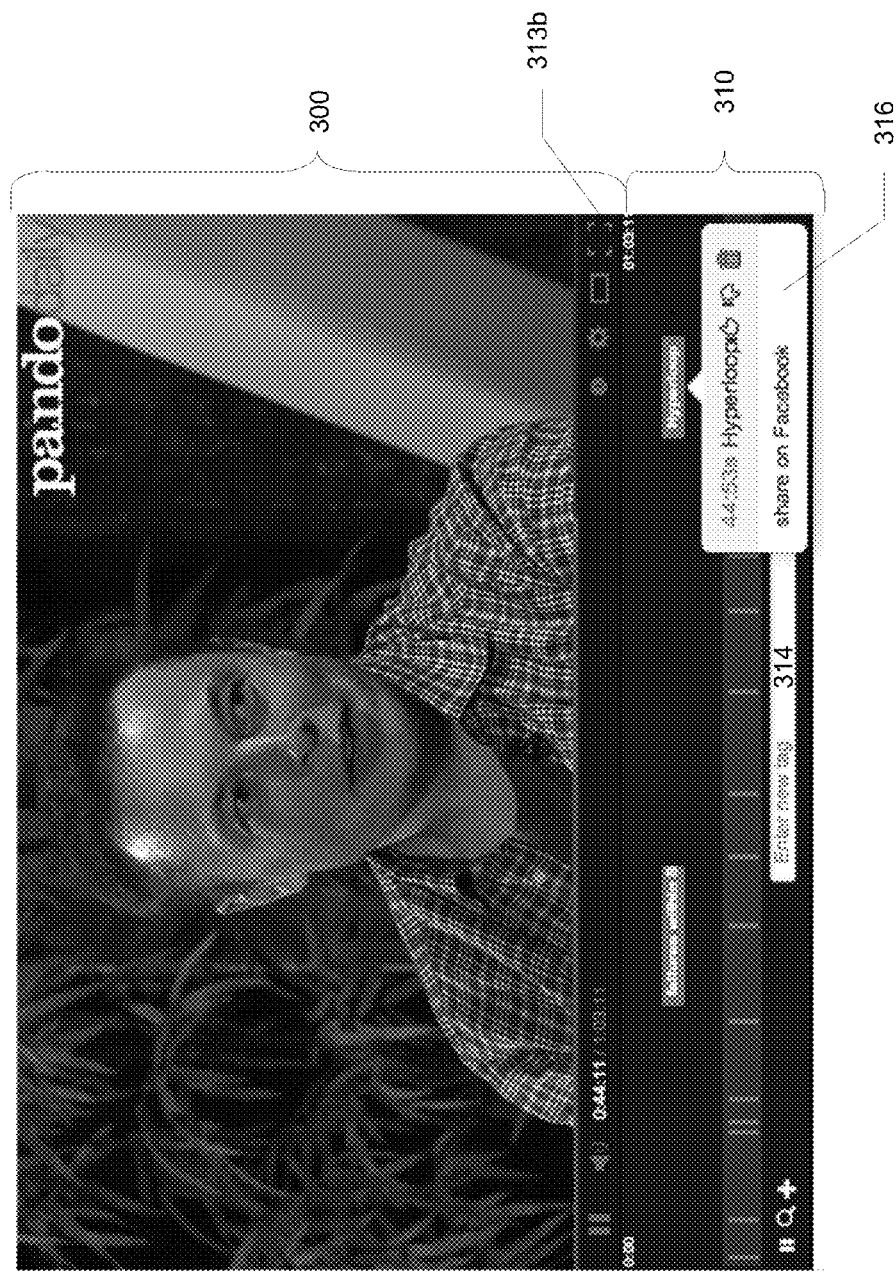

FIGS. 3A-B illustrate a video player 300, an annotation tool 310 and a table of contents 313*a-n* for a video in accordance with an embodiment of the present invention. FIG. 3A depicts an example of an annotation tool 310 that can be added in real-time to the YouTube site or integrated with the YouTube site. In the context of the present example, video consumption and discovery service 100 may present the user with a video selected for viewing by the user within video player 300 concurrently with annotation tool 310. Annotation tool includes a video timeline or progress time bar 311, clip starting point indicators 312 and labels 313*a-n* (collectively, representing at least a portion of the ToC). Annotation tool 310 also includes a search text entry field 315 and a label text entry field 314.

Search text entry field 315 allows the user to initiate a keyword search. If the user has chosen to perform a search, the user is then presented with results in the form of labels and/or clips by management platform, for example. The user can then click on a label/clip to view it.

Label text entry field 314 allows the user to propose a new label for a portion of the video being played or edit an existing label.

Video timeline 311 is a graphic control element used to visually indicate to the user the progression of the video being played. Video timeline 311 may also include one or more clip starting point indicators 312 visually identifying wherein within the current video a clip has been defined by a user by proposing a label to be associated with a particular time offset within the video.

According to one embodiment, labels 313*a-n* represent those of the global ToC for the video being played that have been selected for display to the user based on one or more of filtering, clustering and/or prioritization. For example, based on the user's selected filtering criteria, only those labels proposed by friends may be displayed or only those labels proposed by users with reputation scores meeting a predetermined or configurable threshold may be displayed.

FIG. 3B depicts an example screen shot in which the user is presented with a popup 316 containing a link to share a clip associated with a particular label 313*b* on Facebook. In one embodiment, when the viewer shares a clip to their Facebook news feed a link to the clip is embedded within the status update posted to their Facebook news feed. Popup 316 also allows the user to up or down vote label 313*b*.

Figure 4:
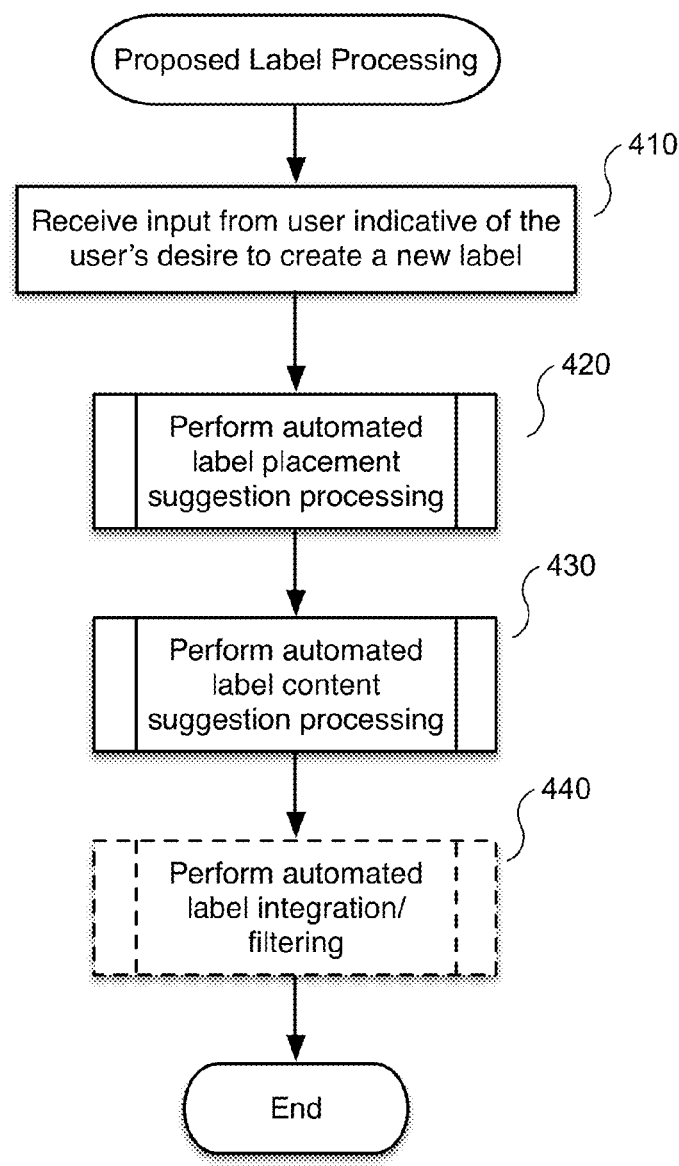
FIG. 4 is a high-level flow chart illustrating proposed label processing in accordance with an embodiment of the present invention.

FIG. 4 is a high-level flow chart illustrating proposed label processing in accordance with an embodiment of the present invention. In the context of the present example, it is assumed that a user of a video consumption and discovery service (e.g., video consumption and discovery service 100) is currently viewing a video.

At block 410, input is received from the user indicative of the user's desire to create a new label.

At block 420, automated label placement suggestion processing is performed to assist the user with selecting an appropriate start time for the clip. As discussed further below with reference to FIG. 5, a label placement suggestion may be provided to the user based on various visual scene boundaries, audio and/or speech change boundaries, closed caption text boundaries and/or Optical Character Recognition (OCR) boundaries identified within proximity to the user-selected time offset within the video.

At block 430, assuming the user has accepted the suggested label placement, proposed label processing continues by performing automated label content suggestion processing. As discussed further below with reference to FIG. 6, one or more label content suggestions may be provided to the user from a set of labels that have been automatically generated based on (i) visual objects, attributes or actions detected within temporal proximity to the current time offset within the video; (ii) speech and/or audio information detected within temporal proximity to the current time offset within the video; and/or (iii) closed caption text and/or OCR data detected within temporal proximity to the user-selected time offset within the video.

At block 440, optional real-time automated label integration/filtering processing is performed. Alternatively, automated label integration/filtering processing may be performed periodically on a recurring basis as described with reference to FIG. 7. As discussed further below with reference to FIG. 9, automated label integration/filtering processing may involve, among other things, a weighted integration of labels via clustering and spam filtering.

Figure 5:
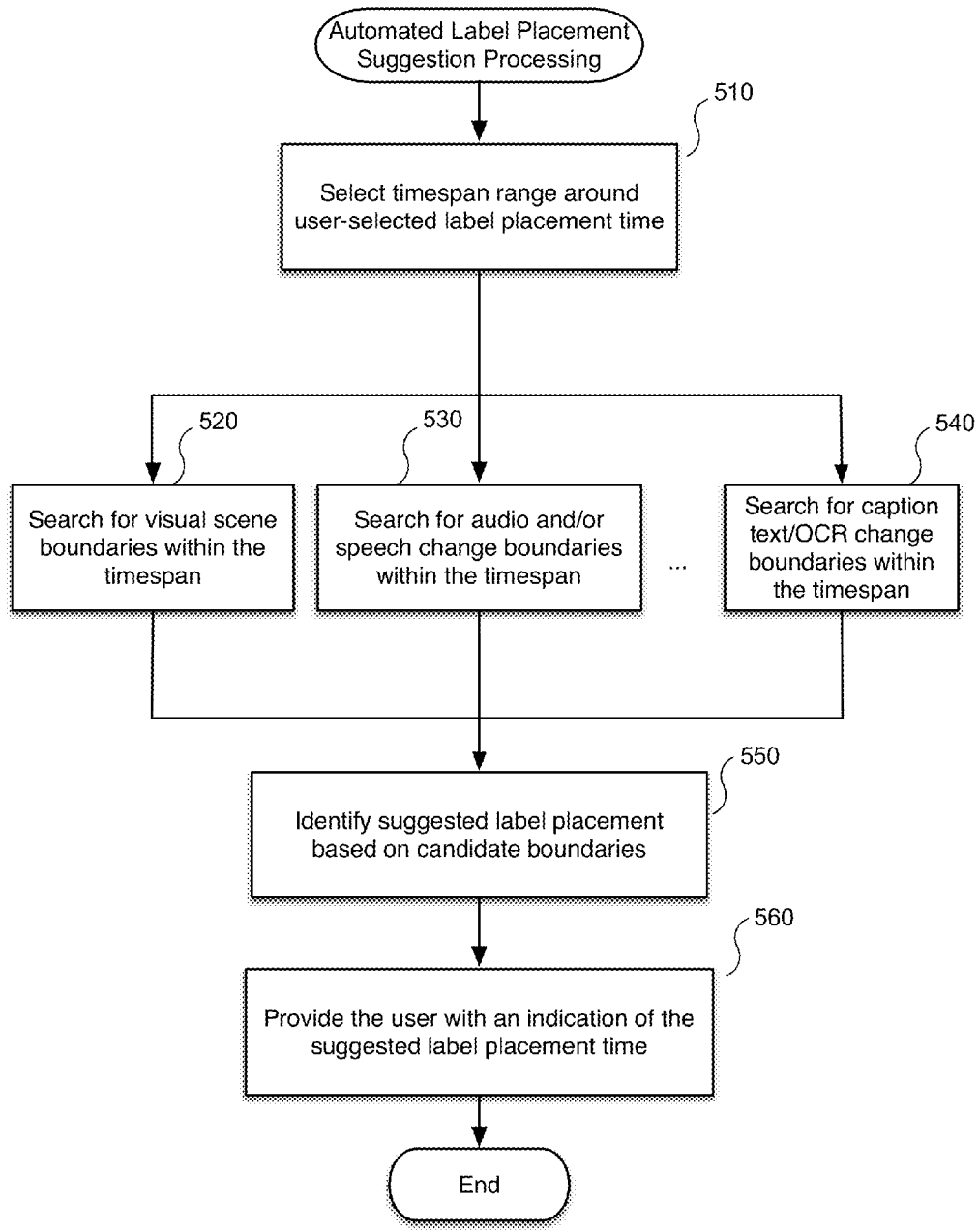
FIG. 5 is a flow chart illustrating automated label placement suggestion processing in accordance with an embodiment of the present invention.

FIG. 5 is a flow chart illustrating automated label placement suggestion processing in accordance with an embodiment of the present invention. In the context of the present example, it is assumed that a user is in the process of proposing a new label for incorporation into a global ToC for a video. According to one embodiment, a set of candidate boundaries are identified within a timespan around a user-selected label placement time and a suggested label placement time is presented to the user based on the identified candidate boundaries.

At block 510, a timespan is selected around a user-selected label placement time (e.g., a time offset within the video corresponding to a user selection within a video timeline, e.g., video timeline 311 or a time offset within the video at the time the user indicated his/her desire to create a new label). While not required, this step may be desirable as the user may select a location within the video timeline that does not correspond precisely with the content they would like to label. The assignee has observed users are generally from one to a few seconds off. Instead of forcing the user to carefully find the exact time instant to place the label, an ideal location for the proposed label can be suggested to the user by analyzing the video within a short timespan (e.g., approximately between 5 to 35 seconds or more depending upon the resolution of the video timeline) around the user-selected location. Depending upon the particular implementation, the user-selected location may be approximately in the middle of the timespan, toward the beginning of the timespan or toward the end of the timespan. For example, the analysis may be performed beginning at a time offset within the video from 5 to 35 seconds prior to the user-selected location and ending at a time offset within the video from 5 to 35 seconds after the user-selected location.

At block 520, visual scene boundaries (and shots) that have previously been automatically identified and logged in video index database 130, for example, are searched for within the selected timespan. Alternatively, visual scene boundaries (and shots) can be identified in real-time within the selected timespan responsive to the user's indication of his/her desire to create a new label. Times associated with these boundaries are added to the candidate boundaries. According to one embodiment, visual scene boundaries and shots may be identified as described in (i) U.S. Pat. No. 6,366,296 entitled "Media Browser Using Multimodal Analysis" and/or (ii) US Pub. No. 2002/0075572 entitled "System and Method for Video Navigation and Client Side Indexing," both of which are hereby incorporated by reference in their entirety for all purposes.

At block 530, audio and/or speech change boundaries that have previously been automatically identified and logged in video index database 130, for example, are searched for within the selected timespan. Alternatively, audio and/or speech change boundaries can be identified in real-time within the selected timespan responsive to the user's indication of his/her desire to create a new label. Times associated with these boundaries are added to the candidate boundaries. According to one embodiment, visual scene boundaries and shots may be identified as described in (i) U.S. Pat. No. 6,278,446 entitled "System for Interactive Organization and Browsing of Video" and/or (ii) U.S. Pat. No. 6,366,296 (cited above), both of which are hereby incorporated by reference in their entirety for all purposes.

At block 540, closed caption text and/or OCR change boundaries that have previously been automatically identified and logged in video index database 130, for example, are searched for within the selected timespan. Alternatively, closed caption text and/or OCR change boundaries can be identified in real-time within the selected timespan responsive to the user's indication of his/her desire to create a new label. Times associated with the identified boundaries are added to the candidate boundaries. According to one embodiment, closed caption text and/or OCR change boundaries may be identified as described in World Intellectual Property Organization Pub. No. WO 1996017313 entitled "Method and Apparatus for Indexing Multimedia Information Streams," which is hereby incorporated by reference in its entirety for all purposes.

At block 550, a suggested label placement time is identified based on the set of candidate boundaries. According to one embodiment, the time associated with the most significant boundary of the set of candidate boundaries is selected as the suggested label placement time. Those skilled in the art will appreciate that a number of different approaches can be adopted to compute boundary significance. Two non-limiting examples include (i) an approach involving pre-assignment of priority or ranking values to the various types of boundaries; and (ii) an approach that makes use of probabilities of the various types of boundaries. For example, a simple way of using pre-assigned priority or ranking values for different types of boundaries may involve, for example, ranking speech boundaries to be most important, then text boundaries and then visual scene boundaries. Thus, if a speech boundary and a visual scene boundary are detected within the timespan, the time location of the speech boundary may be given priority over the visual scene boundary and the speech boundary will be selected as the label placement time. An alternative approach may involve obtaining probability numbers associated with boundaries, e.g., assigning or determining a probability that the visual scene changed at a particular time or the probability that speech started at another time. The probability for each type of boundary (visual, speech, text, etc.) may then be multiplied with each other at each time location, and the time location with the highest probability may be chosen as the suggested boundary placement time.

Notably, the boundaries discussed above are merely exemplary in nature and more or fewer types of boundaries may be used depending upon the particular implementation. For example, in one embodiment, an additional set of candidate boundaries may be identified based on a joint search involving a combination of visual scene boundaries and audio boundaries within the selected timespan. According to one embodiment, identification of joint audio, video and text boundaries may be identified as described in WO 1996017313 (cited above).

In alternative embodiments, rather than providing the user with a suggested label placement time, the system may simply automatically assign a start time to the proposed label by snapping to the closest or most significant boundary within proximity to the user-selected label placement time, for example, in a manner similar to the way diagramming software aligns user-placed objects with a grid when snap-to-grid functionality enabled.

Figure 6:
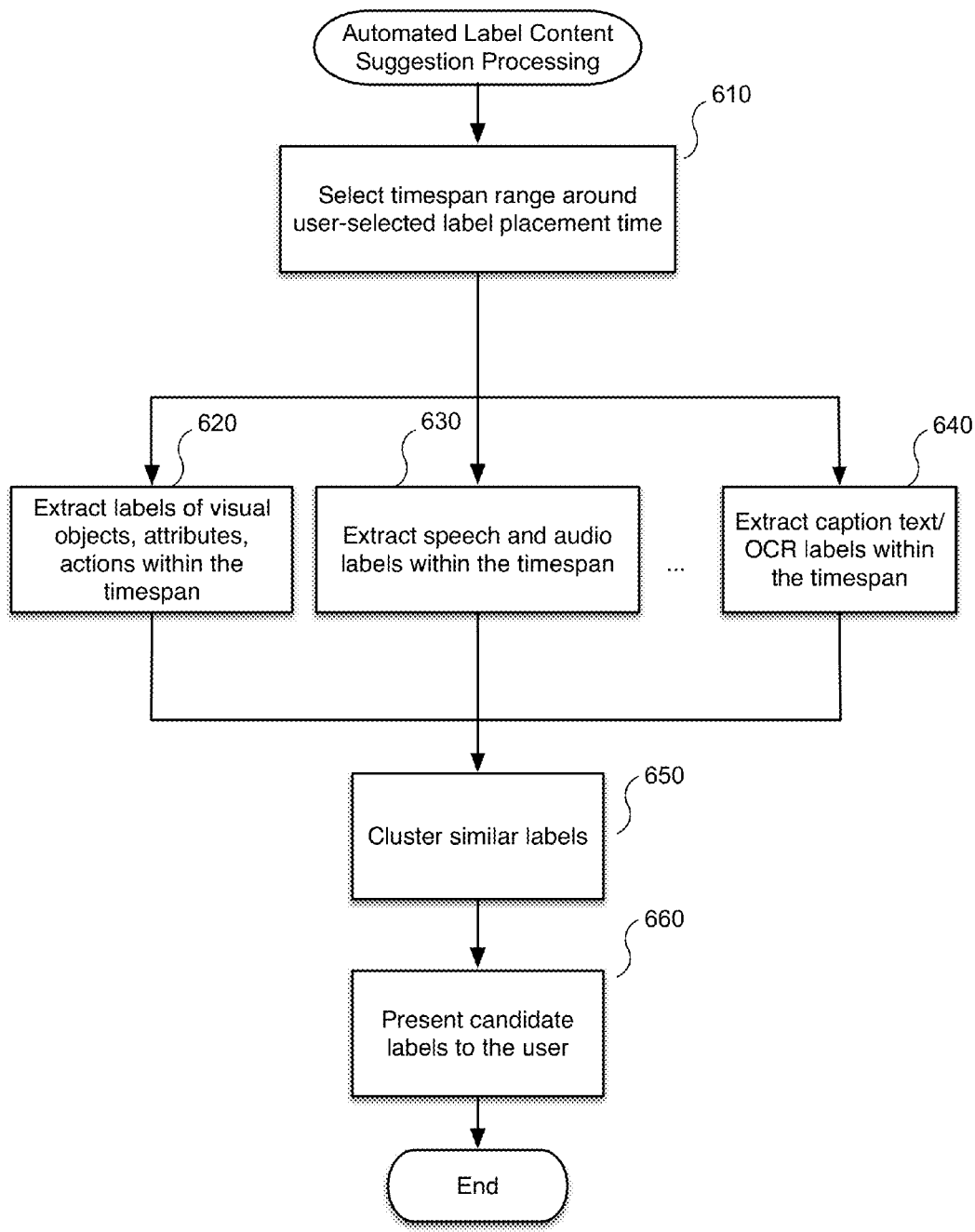
FIG. 6 is a flow chart illustrating automated label content suggestion processing in accordance with an embodiment of the present invention.

FIG. 6 is a flow chart illustrating automated label content suggestion processing in accordance with an embodiment of the present invention. In the context of the present example, it is assumed that a user is in the process of proposing a new label for incorporation into a global ToC for a video. According to one embodiment, a number of candidate labels are automatically identified within a timespan around a user-selected label placement time and these are presented to the user for consideration.

At block 610, a timespan is selected around a user-selected label placement time (e.g., a time offset within the video corresponding to a user selection within a video timeline, e.g., video timeline 311 or a time offset within the video at the time the user indicated his/her desire to create a new label).

At block 620, labels that have been previously automatically generated (based on previously performed detection of objects, object attributes and/or actions contained within the video) and logged in video index database 130, for example, within the selected timespan are extracted and added to a set of candidate labels. Alternatively, these labels may be generated in real-time for the selected timespan responsive to the user's indication of his/her desire to create a new label. According to one embodiment, automatic generation of labels based on detection of objects, object attributes and/or actions may be performed as described in (i) H. Weiming, X. Nianhua, L. Li, Z. Xianglin, S. Maybank, "A Survey on Visual Content-Based Video Indexing and Retrieval," *Systems, Man, and Cybernetics, Part C: Applications and Reviews, IEEE Transactions on*, vol. 41, no. 6, pp. 797-819, November 2011 and/or (ii) P. Turaga, R. Chellappa, V. Subrahmanian, O. Udrea, "Machine Recognition of Human Activities: A Survey," *Circuits and Systems for Video Technology, IEEE Transactions on*, vol. 18, no. 11, pp. 1473-1488, November 2008, both of which are hereby incorporated by reference in their entirety for all purposes.

At block 630, labels that have been previously automatically generated (based on previously performed detection relating to speech and/or audio information contained within the video) and logged in video index database 130, for example, within the selected timespan are extracted and added to the set of candidate labels. Alternatively, these labels may be generated in real-time for the selected timespan responsive to the user's indication of his/her desire to create a new label. According to one embodiment, automatic extraction of candidate labels from speech and/or audio may be performed as described in H. Cheng, J. Liu, S. Ali, O. Javed, at al., "SRI-Sarnoff AURORA System at TRECVID 2012: Multimedia Event Detection and Recounting", In Proc. of NIST TRECVID and Workshop, Gaithersberg, USA, 2012, which is hereby incorporated by reference in its entirety for all purposes.

At block 640, labels that have been previously automatically generated (based on previously performed detection relating to closed caption text and/or OCR information contained within the video) and logged in video index database 130, for example, within the selected timespan are extracted and added to the set of candidate labels. Alternatively, these labels may be generated in real-time for the selected timespan responsive to the user's indication of his/her desire to create a new label. According to one embodiment, automatic generation of labels based on detection of closed caption text and/or OCR information may be performed as described in WO 1996017313 (cited above).

Notably, the various video attributes discussed above are merely exemplary in nature and more or fewer video attributes may be used depending upon the particular implementation.

At block 650, similar labels are merged into a single label using clustering. For example, if one label is "Racing" and another label for the same time-frame is "Horse Racing," the shorter label may be merged/integrated into the more descriptive "Horse Racing" label. According to one embodiment, this label clustering/merging is performed as described in A. K. Jain, M. N. Murty, and P. J. Flynn. "Data clustering: a review." ACM Comput. Surv. 31, 3, 1999, which is hereby incorporated by reference in its entirety for all purposes. According to one embodiment, this label clustering/merging is performed as described in A. K. Jain, M. N. Murty, and P. J. Flynn. "Data clustering: a review." ACM Comput. Surv. 31, 3, 1999, which is hereby incorporated by reference in its entirety for all purposes.

At block 660, the list of final candidate labels is presented to the user for consideration. The user can then choose to select one of the candidate labels or write his/her own label for that time location in the video.

Figure 7:
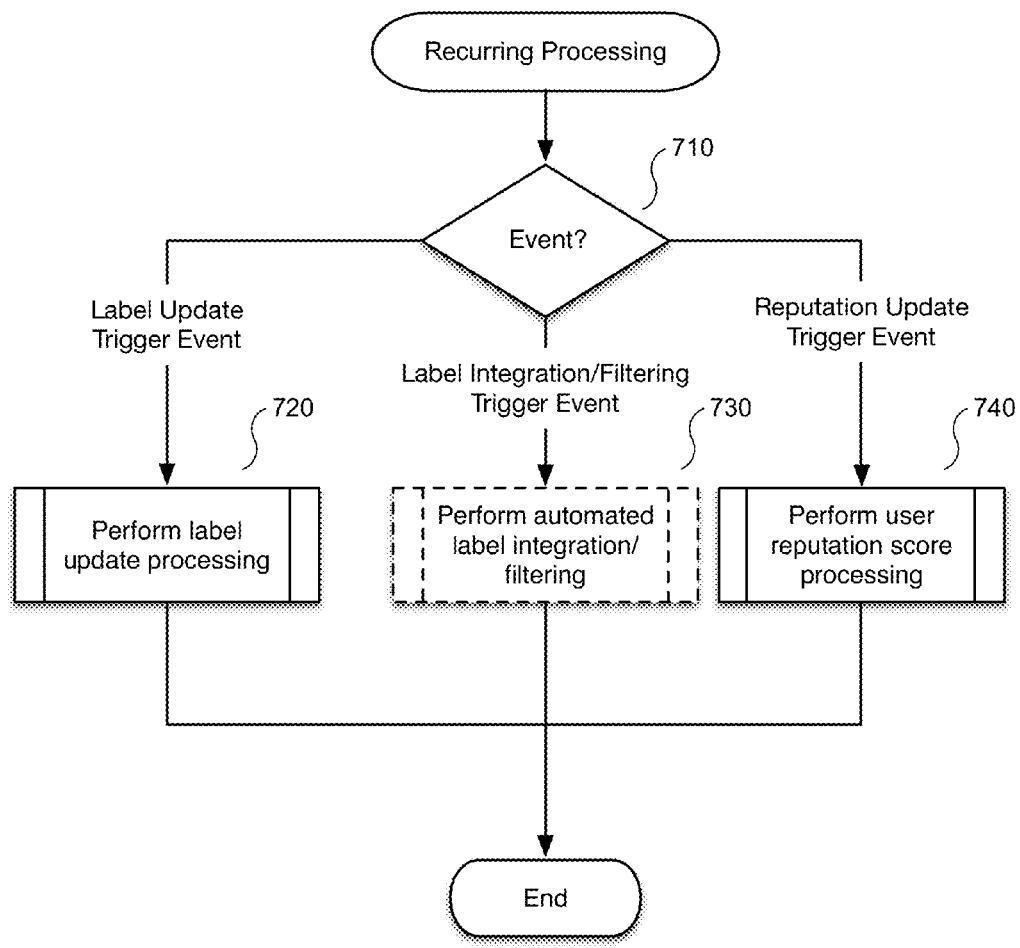
FIG. 7 is a high-level flow chart illustrating recurring processing in accordance with an embodiment of the present invention.

FIG. 7 is a high-level flow chart illustrating recurring processing in accordance with an embodiment of the present invention. In the context of the present example, it is assumed that various background recurring processing is performed responsive to corresponding triggering events and at least one of such triggering events has occurred upon reaching decision block 710. Those skilled in the art will appreciate non-limiting examples of such triggering events may relate to receipt of input from one or more users, may be time-based, may be based on a score, rating or the like reaching a particular threshold, etc. In one embodiment of the present invention, a processor of a computer system upon which the recurring processing is performed may receive interrupts on a periodic basis or upon detection of a triggering event by another process. Such interrupts may be received, for example, responsive to receipt of user input (e.g., a new label, new user feedback, etc.) or on a periodic basis (e.g., every few seconds or so). Such interrupts may be received using any interrupt scheme known in the art including, but not limited to, using a polling scheme where the processor periodically reviews an interrupt register, or using an asynchronous interrupt port of the processor. Alternatively or additionally, the processor may proactively request data from a video index database (e.g., video index database 130) on a periodic or as needed basis. Based on the disclosure provided herein, one of ordinary skill in the art will recognize a variety of interrupt and/or polling mechanisms that may be used in relation to different embodiments of the present invention.

At decision block 710, the type of trigger event that has occurred is determined. If the trigger event that has caused recurring processing to be performed is a label update trigger event, then processing continues with block 720. If the trigger event that has caused recurring processing to be performed is a label integration/filtering trigger event, then processing branches to block 720. If the trigger event is a reputation update trigger event, then processing continues with block 730.

At block 720, label update processing is performed. In one embodiment, label update processing involves selecting or otherwise marking those labels to be included within the ToC to be presented to general users based on one or more criteria, including, but not limited to, the net number of votes for the label, the number of labels within the cluster and the reputation of the user that proposed the label. Exemplary label update processing is described below with reference to FIG. 8.

At block 730, automated label integration/filtering processing is performed. In one embodiment, automated label integration/filtering processing involves performing a weighted clustering of labels based on the addition of one or more newly added labels. An example of label update processing is described below with reference to FIG. 9. Note that in the context of the present example, block 730 is shown with a dotted outline to convey that it is an optional recurring process as automated label integration/filtering processing may be performed at the time proposed new label content and/or placement is received from a user as shown and described with reference to FIG. 4.

At block 740, user reputation score processing is performed. In one embodiment, user reputation score processing involves calculation of a weighted average of various scores indicative a reputation for one or more users. A user's reputation may be based on one or more of the following non-limiting examples: (i) an authorship score based on labels the user has proposed; (ii) the user's voting history and the correlation of the user's voting history with other user's voting history; and (iii) the reputation of users within the user's social circle. An example of user reputation score processing is described below with reference to FIG. 10.

Those skilled in the art will appreciate trigger events need not be mutually exclusive and therefore one or more of a label update trigger event, label integration/filtering trigger event and a reputation update trigger event may be concurrently triggered.

Figure 8:
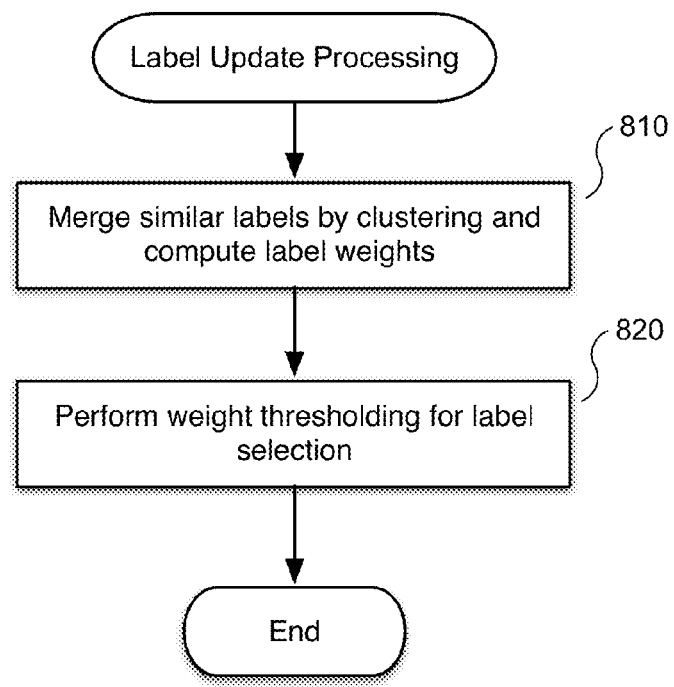
FIG. 8 is a flow chart illustrating label update processing in accordance with an embodiment of the present invention.

FIG. 8 is a flow chart illustrating label update processing in accordance with an embodiment of the present invention. In some embodiments, if there is a sufficient concentration of similar labels in a certain area of a video, the labels may be merged into one or more parent labels via clustering. Clustering may be based on the time offset of the labels, similarity of content, and properties of the underlying scenes within the video. According to one embodiment, label update processing may be periodically triggered responsive to receipt of one or more votes (e.g., up votes, down votes, likes, dislikes) for existing labels within the global ToC. In other embodiments, various other label update trigger events may be used alone or in combination, including expiration of a timer. In the context of the present example, the discussion assumes similar labels have been grouped by performing label clustering. An example of label clustering is described below with reference to block 930 of FIG. 9.

At block 810, similar labels are merged using clustering and then label weights are calculated. Label weights are calculated based on the current vote counts (e.g., the net of up votes, down votes, likes, dislikes). In one embodiment, other criteria might be used for label weight calculation including, weighting of labels based on user's reputation, similarity of the label and the underlying video content, sentiment of the label, etc.

At block 820, weight thresholding is performed. In one embodiment, those labels within the global ToC falling below a particular weight threshold may be excluded from the ToC presented to general users and those meeting the particular weight threshold may be selected for inclusion within the ToC presented to general users. For example, labels failing to meet a predetermined or configurable weight threshold may be marked as not visible to general users and labels meeting the predetermined or configurable weight threshold may be marked as visible to all users as discussed further below with reference to FIG. 12.

Figure 9:
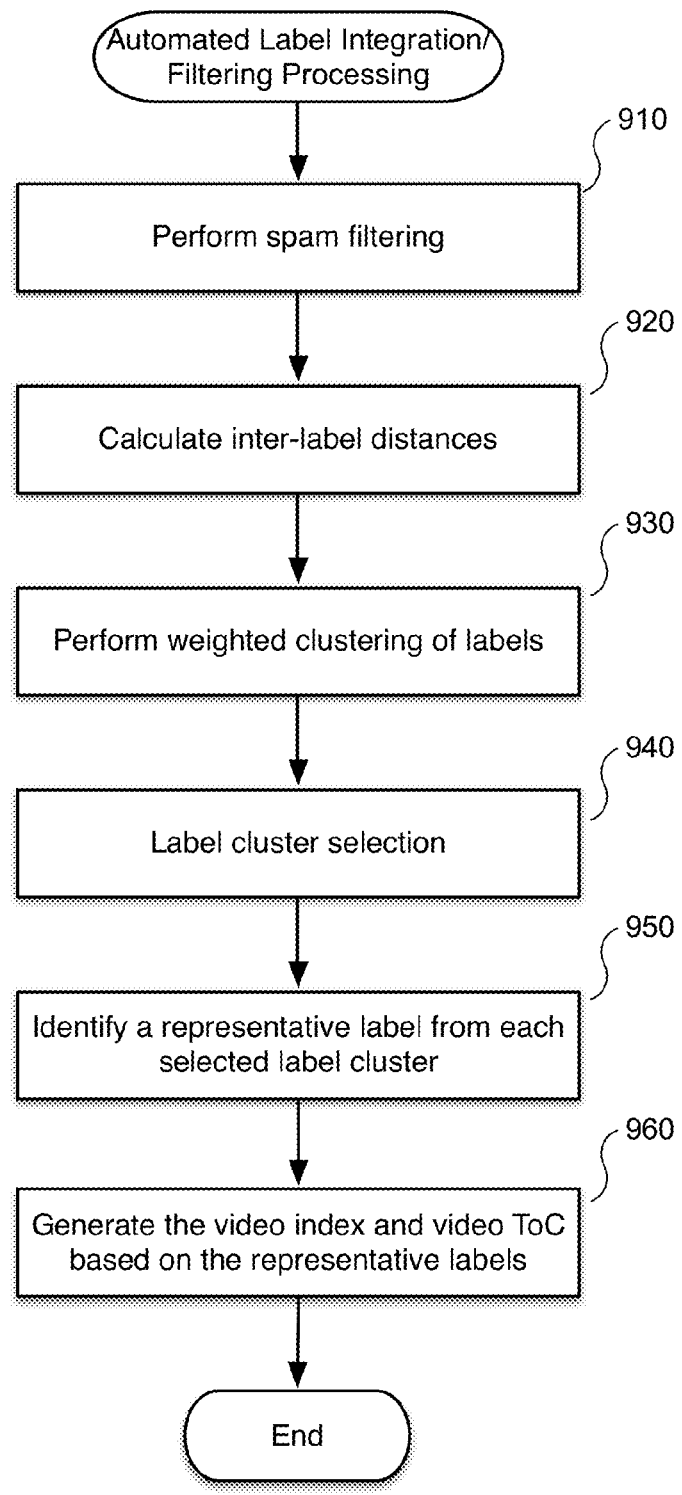
FIG. 9 is a flow chart illustrating automated label integration/filtering processing in accordance with an embodiment of the present invention.

FIG. 9 is a flow chart illustrating automated label integration/filtering processing in accordance with an embodiment of the present invention. According to one embodiment, automated integration/filtering processing may be periodically triggered responsive to receipt of one or more new labels within a particular timespan of a video. In other embodiments, various other automated label integration/filtering trigger events may be used alone or in combination, including expiration of a timer. In the context of the present example, the discussion assumes automated label integration/filtering processing has been triggered as a result of the addition of a new label (e.g., manually by a user or automatically). Based on the discussion below, those skilled in the art will appreciate how to extend the automated label integration/filtering processing to accommodate other trigger events.

At block 910, spam filtering may be performed. According to one embodiment, training may be used to assist with automated identification of content likely to be spam or other content that may be irrelevant to the context of the video or clip at issue. For example, a quality control system may be trained by providing it with content that is known to be spam and content that is known not to be spam. Based on this information, the system can then categorize, to a degree, new content, which is likely to be spam. Thereafter, the quality control system may automatically filter out bad data provided by users based on the training and/or information provided by members, such as moderators, that may be provided with the ability to flag labels as spam, inappropriate content or irrelevant content. According to one embodiment, the spam filtering is performed according to one of the methods described in Nikita Spirin and Jiawei Han, "Survey on web spam detection: principles and algorithms." SIGKDD Explor. Newsl. 13, 2 (May 2012), 50-64, which is hereby incorporated by reference in its entirety for all purposes.

At block 920, inter-label distances between the newly added label and existing labels are calculated. According to one embodiment, the distance between two labels is a weighted combination of distance between the time offsets of the two labels and the text content of the labels. Depending upon the particular implementation, various distance measures can be used for estimating the distance between the text content of two labels including:

String similarity measures (see, e.g., Gonzalo Navarro. "A guided tour to approximate string matching". ACM Computing Surveys 33 (1): 31-88, 2001, which is hereby incorporated by reference in its entirety for all purposes. Non-limiting examples of string similarity measures include:

Levenshtein distance (see, e.g., Brill and Moore (2000). "An Improved Error Model for Noisy Channel Spelling Correction". Proceedings of the 38th Annual Meeting on Association for Computational Linguistics. pp. 286-293, which is hereby incorporated by reference in its entirety for all purposes.

Hamming distance (see, e.g., Navarro (cited above)).

Jaccard similarity (see, e.g., P. Tan, M. Steinbac, V. Kuma, "Introduction to Data Mining," ISBN 0-321-32136, 2005, which is hereby incorporated by reference in its entirety for all purposes.

Semantic similarity measures (see, e.g., S. Harispe, S. Ranwez, S. Janaqi, J. Montmai, "Semantic Measures for the Comparison of Units of Language, Concepts or Instances from Text and Knowledge Base Analysis" ArXiv 1310.1285, 2013, which is hereby incorporated by reference in its entirety for all purposes), including, but not limited to:

Distance over semantic knowledge-bases like WordNet (see, e.g., G. A. Miller, R. Beckwith, C. D. Fellbaum, D. Gross, K. Miller, "WordNet: An online lexical database." Int. J. Lexicograph. 3, 4, 1990, which is hereby incorporated by reference in its entirety for all purposes).

Logic based semantic similarity (see, e.g., F. M. Couto, H. S. Pinto, "The next generation of similarity measures that fully explore the semantics in biomedical ontologies" Journal of Bioinformatics and Computational Biology, 2013, which is hereby incorporated by reference it its entirety for all purposes).

At block 930, weighted clustering of labels is performed. In one embodiment, the goal of clustering is to group similar labels. A cluster can potentially contain a single label if no other labels are similar to it. Depending upon the needs of the particular implementation, one or more of the following non-limiting clustering approaches can be used to group labels:

Spectral clustering. See, e.g., M. Filippone, F. Camastra, F. Masulli, S. Rovetta, "A survey of kernel and spectral methods for clustering, Pattern Recognition", 41, 1, 2008, which is hereby incorporated by reference in its entirety for all purposes.

Agglomerative clustering or centroid based clustering. See, e.g., A. K. Jain, M. N. Murty, and P. J. Flynn. "Data clustering: a review." ACM Comput. Surv. 31, 3, 1999, which is hereby incorporated by reference in its entirety for all purposes.

At block 940, label cluster selection is performed for indexing and ToC generation. In one embodiment, label cluster selection is based on the weight of the cluster, for example the top 10 weighted clusters can be selected or clusters with weight higher than a predetermined threshold can be selected, etc. Note that each cluster can have one or more labels. The weight of the cluster may be computed based on the labels grouped in that particular cluster, for example, the net number of votes for each label and/or other criteria. Various other criteria might include, weighting of labels based on reputation of users for user generated labels, similarity of the label and the underlying video content, sentiment of the label, the performance confidence of automatic algorithms if the label was provided by automatic indexing mechanisms, etc.

At block 950, the labels in a cluster are merged to obtain a single representative label from each of the selected clusters. In one embodiment, the most frequently occurring phrase in a cluster is identified as the representative label. In another embodiment, the longest or most descriptive label is selected as the representative label.

At block 960, the representative labels and their associated time offsets are used to index the system and are chronologically ordered to create a video ToC.

Figure 10:
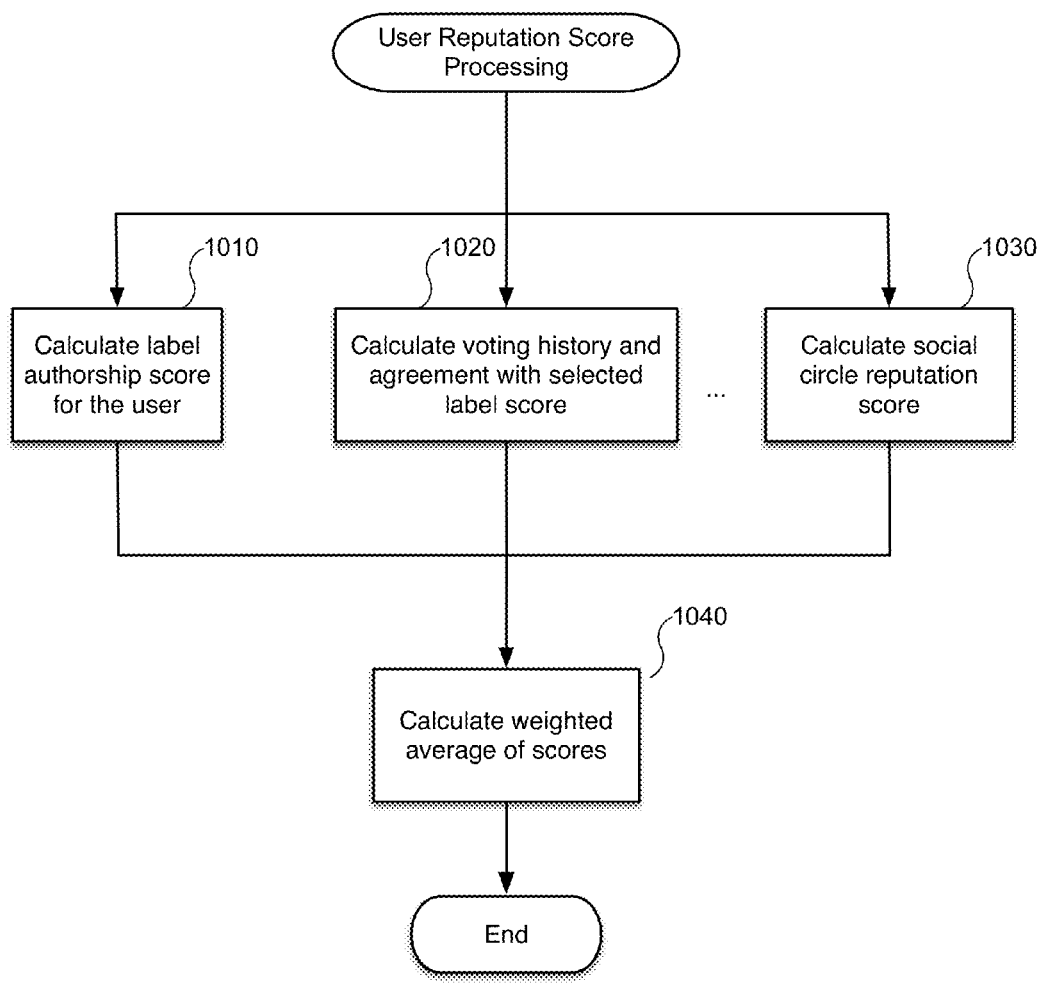
FIG. 10 is a flow chart illustrating user reputation score processing in accordance with an embodiment of the present invention.

FIG. 10 is a flow chart illustrating user reputation score processing in accordance with an embodiment of the present invention. In the context of the present example, a user reputation score is periodically recalculated for each user based on a weighted average of the user's label authorship score, the user's voting history and the reputation of the user's social circle. Those skilled in the art will appreciate various other factors may contribute to a user's reputation score, including, but not limited to, quantity of labels contributed, length of membership with the service, hours of video consumed, the absence or presence of a completed user profile, characteristics of the user profile and the like.

At block 1010, a label authorship score is calculated for the user. In one embodiment, the label authorship score is the aggregate net vote count by third parties for all labels contributed by the user. In another embodiment, an average net vote count may be used by dividing the aggregate net vote count by the number of labels contributed by the user.

At block 1020, a voting history score is calculated. In one embodiment, the voting history score is higher for users whose voting history is more in agreement with other users of the service. For example, the voting history score may reflect the general correlation of the user's voting history (e.g., up votes, down votes, likes, dislikes) with respect to labels and the ultimate weights assigned to such labels.

At block 1030, a social circle reputation score is calculated. According to one embodiment, the social circle reputation score reflects the aggregate user reputation scores of all connections/friends of the user within the service.

At block 1040, a weighted average of all calculated scores for the user is determined. For example, in the context of the present example, a weighting factor may be applied to each of the authorship score, the voting history score and the social circle reputation score to arrive at the ultimate user reputation score for the user at issue.

Figure 11A:
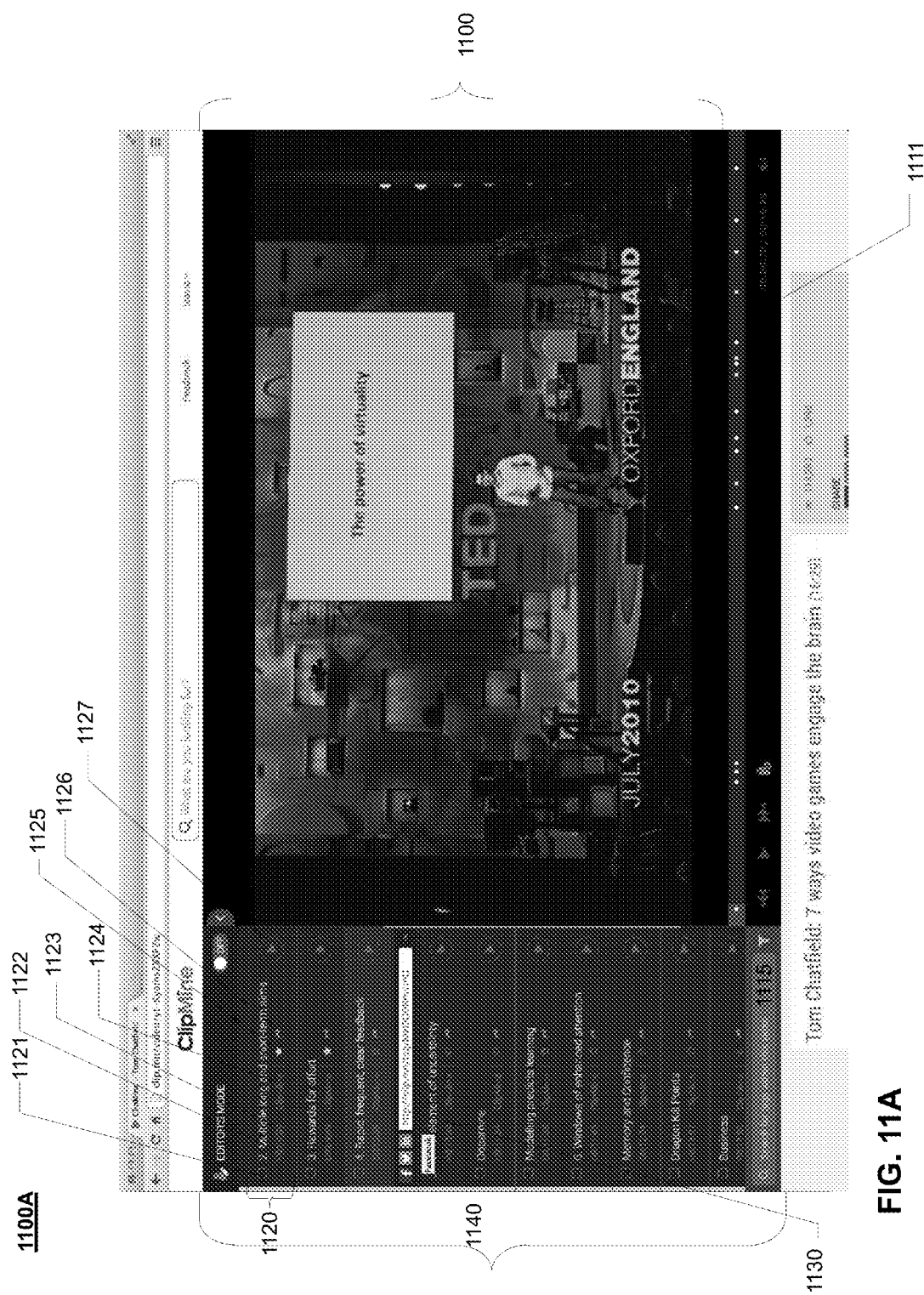
FIGS. 11A-C illustrate various screen shots of a video player and a combined annotation tool and table of contents for a video in accordance with an alternative embodiment of the present invention.
Figure 11B:
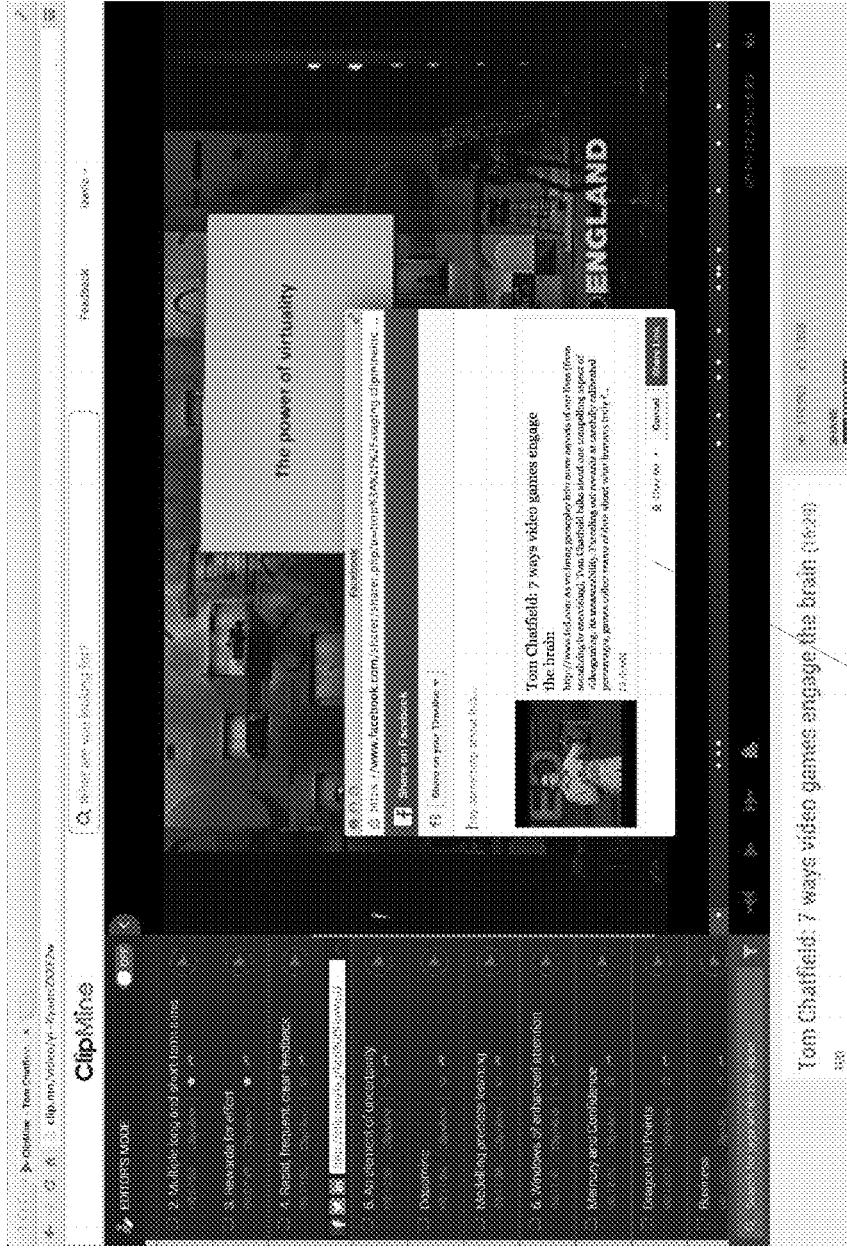
Figure 11C:
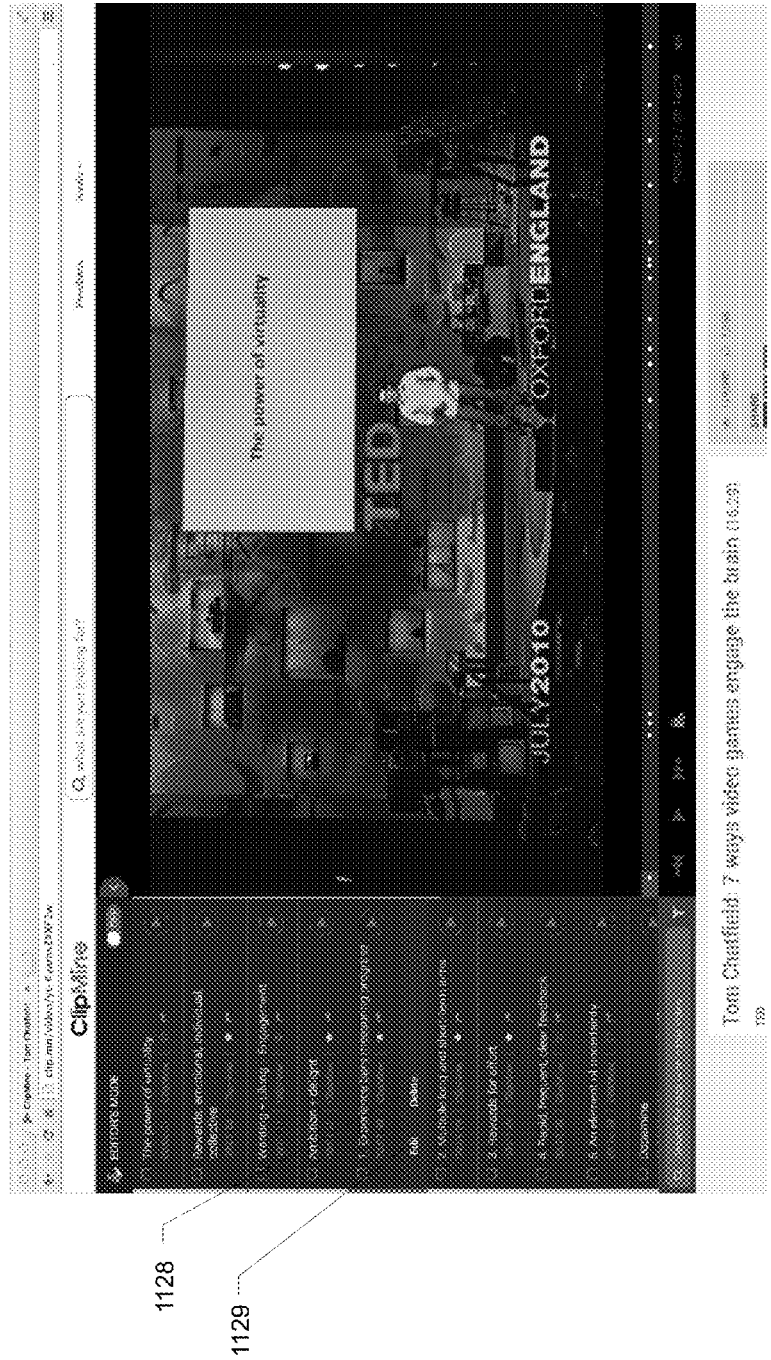

FIGS. 11A-C illustrate various screen shots of a video player 1100 and a combined annotation tool and ToC 1140 for a video in accordance with an alternative embodiment of the present invention. FIG. 11A is a screen shot 1100A depicting video player 1100 adjacent to combined annotation tool and ToC 1140 in which the user is in the process of sharing a clip to a social networking site. Combined annotation tool and ToC 1140 includes multiple interactive ToC objects (e.g., ToC object 1120) each including a check box 1121, a label 1122, a start time 1123, an indication of the author (or originator) 1124, a selectable favorite icon 1125, a selectable share icon 1126 and a play button 1127. In one embodiment, the multiple interactive ToC objects are dynamically generated responsive to a user request to view a video based on the global ToC information (e.g., the collection of all proposed labels and associated information, such as start time, author, vote statistics, etc.). As such, combined annotation tool and ToC may appear differently (e.g., include more, fewer and/or customized ToC entries) to different users depending upon the user-selected filtering criteria. For example, a user may only choose to see ToC objects, e.g., those associated with labels/tags, created by him or herself, or tags created by other people in her/her social network, tags with certain minimum number of votes, or tags created by the service provider.

As in the earlier example discussed with reference to FIGS. 3A and 3B, combined annotation tool and ToC 1140 may include a search text entry field 1115 to provide the user with the ability to initiate a keyword search within the current video. A video timeline 1111 may also be include to provide the user with information regarding the progression of the video being played and/or indicators of label placement within the video.

According to one embodiment, label 1122 represents the content (e.g., text, symbols, icons, etc.) that has been selected to be associated with the clip of the video from among many potential proposed labels based upon label update processing (see, e.g., FIG. 8 and the corresponding description above), automated label integration/filtering processing (see, e.g., FIG. 9 and the corresponding description above), user reputation score processing (see, e.g., FIG. 10 and the corresponding description above) and/or user-specific label selection processing (see, e.g., FIG. 13 and the corresponding description below).

Start time 1123 represents the time offset associated with label 1122. Typically the time offset is measured from the beginning of the video and the video begins at time 00:00:00. Play button 1127 may be selected by the user to skip to and begin playing of the associated video clip within the video.

Author indication 1124 provides information regarding the originator of label 1122. Typically, the originator will be identified by their username within the video consumption and discovery service. In the context of the present example, the originator is ClipMine, the assignee of the present invention and the entity providing the video consumption and discovery service. As such, the information associated with ToC object 1120 would be understood by users to be the result of automated video indexing techniques.

In the present example, selectable favorite icon 1125 is presented in the form of a star. The star may have one appearance (e.g., unfilled outline, unhighlighted) when the associated clip has not been selected by the user as a favorite and may have another appearance (e.g., solid filled, highlighted) when the clip has been selected as a favorite.

In the present example, selectable share icon 1126 is presented in the form of a forward arrow. When selected by the user, one or more icons associated with social networking sites may be displayed along with a URL of the clip 1130. Upon selection of one of the social networking icons, a pop-up (e.g., pop-up 1150 of FIG. 11B) may be displayed. In alternative embodiments, the user may be provided the ability to share clips via electronic mail (email), Short Message Service (SMS) and/or Multimedia Messaging Service (MMS).

FIG. 11B is a screen shot 1100B depicting a pop-up screen 1150 of the Facebook social networking site displayed to the user responsive to the user's indication of a desire to share a clip to their Facebook news feed by selection of selectable share icon 1126 and subsequent selection of the Facebook icon, for example.

FIG. 11C is a screen shot 1100C depicting exemplary interface tools to allow the user to edit existing labels and/or create new labels. In the context of the present example, the user may select an edit button 1129 to propose revisions to the label at issue or may propose a new label by selecting a create button 1128. In one embodiment, edit button 1129 and create button 1128 appear responsive to selection or hovering over associated ToC object. In other embodiments, the user may select a location within video timeline 1111 to create a new label corresponding to the selected start time. In some embodiments, the user may manually select whether combined annotation tool and ToC 1140 should be presented in an editing mode.

Figure 12:
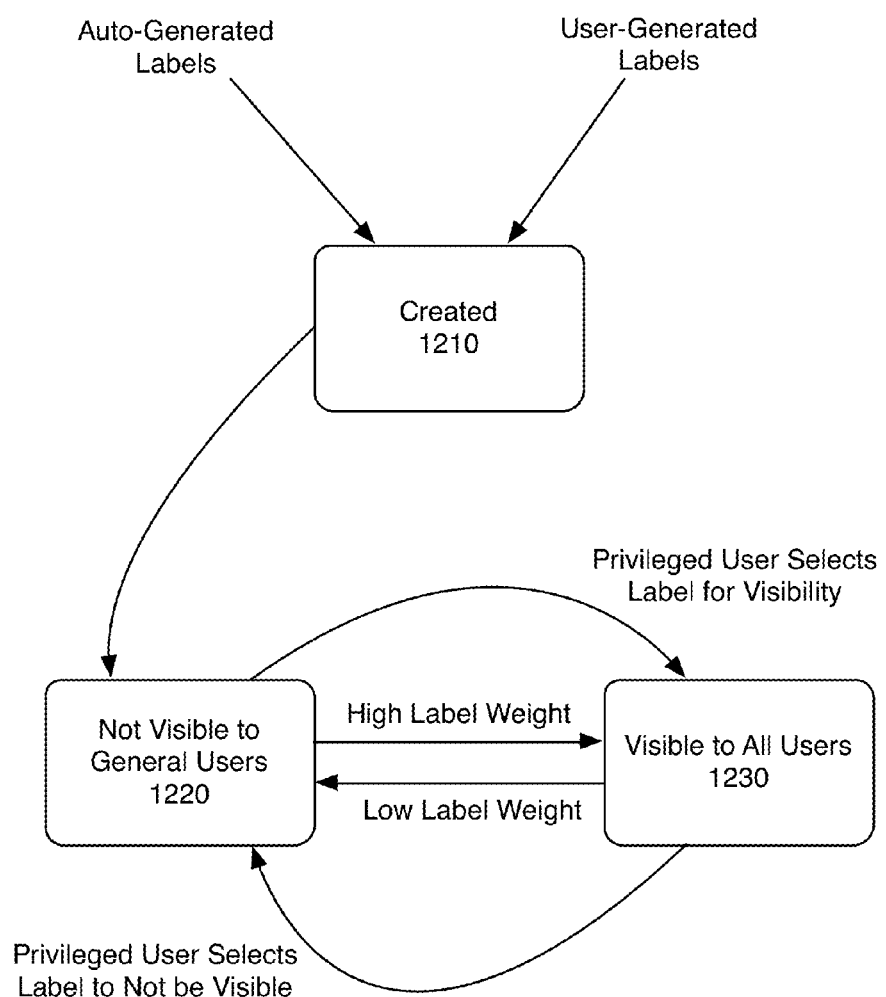
FIG. 12 is a state diagram illustrating various states of a label in accordance with an embodiment of the present invention.

FIG. 12 is a state diagram 1200 illustrating various states of a label in accordance with an embodiment of the present invention. In the context of the present example, a label may be in one of three states, a created state 1210, a not visible to general users state 1220 and a visible to all users state 1230. In the non visible to general users state 1220, the label is not included as part of a ToC during video consumption by general users, but may be visible to privileged users. In the visible to all users state 1230, the label is available for inclusion as part of a ToC during video consumption and will be part of the ToC assuming it meets the user-specific filtering criteria.

A newly proposed label (e.g., one that is auto-generated or one that is user-generated) is initially in the created state 1210. Newly created labels then transition automatically to the not visible to general users state 1220.

In the current example, there are two ways, that the state of the label can be updated to the visible to all users state 1230: (i) the automatic label integration module (if used), selects the label as part of a highly weighted cluster; or (ii) a user with a privileged status manually designates the label to be visible. The privileged status can be manually assigned to users or a subset of users can be selected automatically for the privileged status based on various criteria, including, but not limited to, (a) random selection, (b) number of prior labels provided by user, (c) the number of net votes received by labels proposed by the user and/or other similar metrics based on user reputation. The users with privileged status are able to see those labels that are in the visible to all users state 1230 as well as those that are in the not visible to general users state 1220 and are able to change the state of a label from the not visible to general users state 1220 to the visible to all users state 1230 and vice versa. As such, this combined approach allowing for input by both privileged users and the automatic label integration module can be thought of as a computer-assisted video labeling/tagging approach.

In alternative embodiments, the automatic label integration module alone may select a label's visibility state based on the weight of the cluster with which it is associated or only users with privileged status may manually designate the visibility state of a label.

Figure 13:
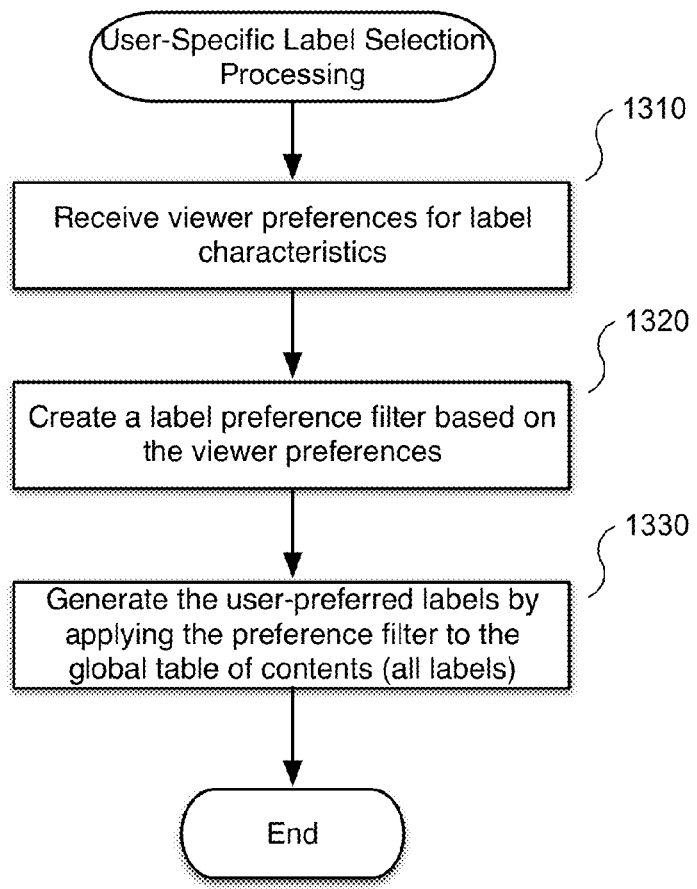
FIG. 13 is a flow chart illustrating user-specific label selection processing in accordance with an embodiment of the present invention.

FIG. 13 is a flow chart illustrating user-specific label selection processing in accordance with an embodiment of the present invention. In the context of the present example, users are provided with the ability to filter the clips/labels presented to them for videos they are viewing by specifying various filtering criteria. In one embodiment, the ToC may be updated in real-time as a result of the user changing the filtering criteria during video playback. According to one embodiment, the user may filter labels/clips by the type of user that proposed them (e.g., labels proposed by the viewer, labels proposed by third parties (connections/friends), those manually defined by any human user and/or those generated as a result of automated video indexing techniques). Those skilled in the art will appreciate various other filtering criteria may be used and may be based on any label or user metadata stored by the system. For example, the user may be able to filter labels based on whether they have been manually approved by a privileged user as opposed to those labels achieving a high label weight as a result of automatic label integration. Labels may also be filtered by the professional affiliation of the corresponding users (e.g., engineer, lawyer, doctor, accountant, etc.) or a group or privileged status of the user (e.g., senior member, junior member, paying subscriber, non-paying subscriber, privileged user, editor, moderator, etc.).

At block 1310, viewer preferences for label characteristics are received by video consumption and discovery service via API 143, for example.

At block 1320, a label preference filter is created based on the received preferences. For example, input received via a graphical user interface (e.g., check box input) may be converted into a Boolean expression or rule.

At block 1330, the preference filter is applied to the global table of contents to extract from the global table of contents for the video at issue only those labels that meet the label preference filter.

Figure 14:
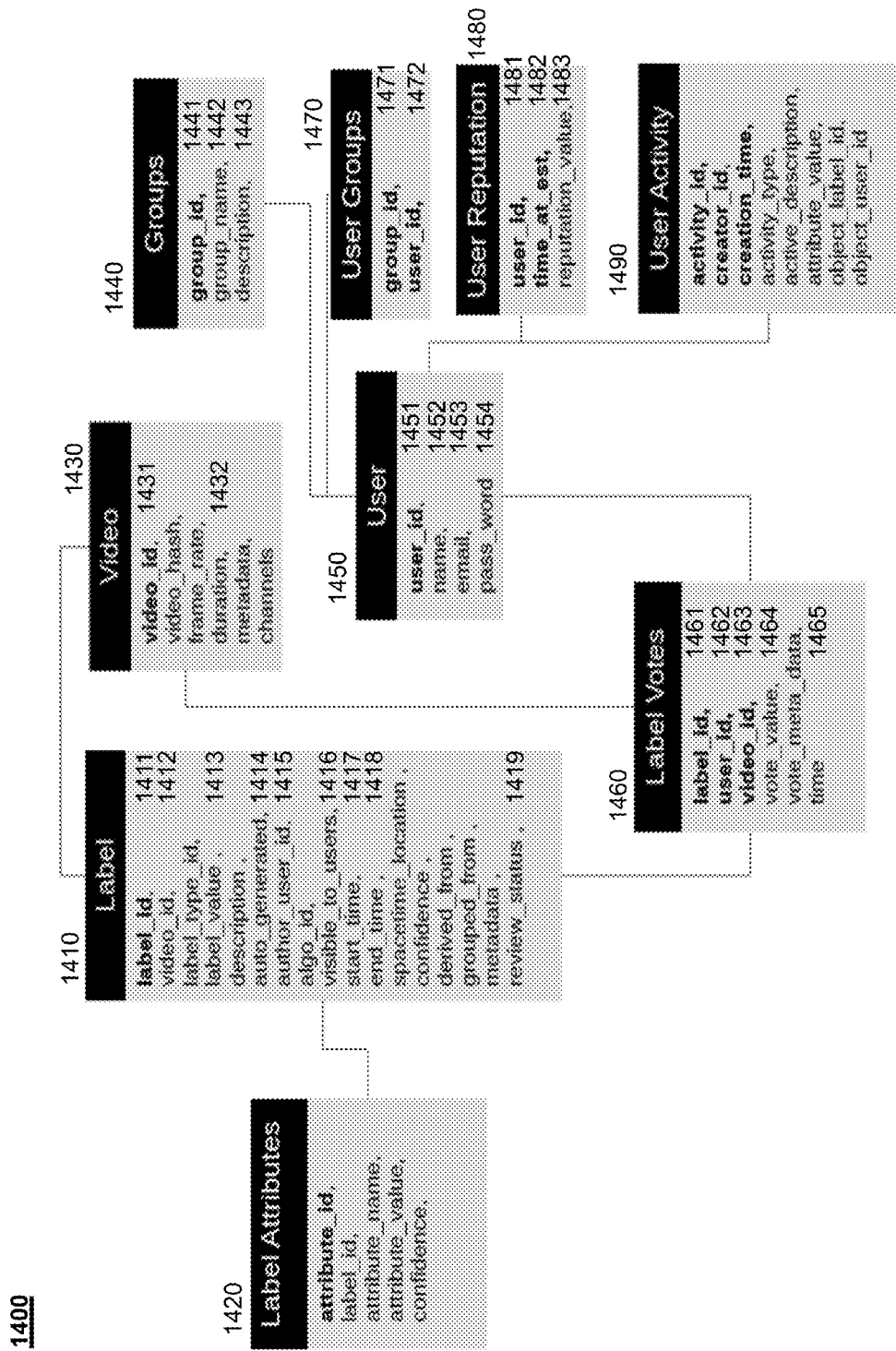
FIG. 14 illustrates a simplified database schema in accordance with an embodiment of the present invention.

FIG. 14 illustrates a simplified database schema 1400 in accordance with an embodiment of the present invention. In the context of the present example, database schema 1400 is represented as a set of exemplary database tables, including a label table 1410, a label attributes table 1420, a video table 1430, a groups table 1440, a user table 1450, a label votes table 1460, a user groups table 1470, a user reputation table 1480 and a user activity table 1490. Fields presented in bold text are those that serve as primary keys. Id values typically represent values that uniquely identify the thing at issue (e.g., label, user, video, group, activity, attribute, etc.) within the system.

Label table 1410 includes, among other potential fields, a label id 1411, a video id 1412, a label value 1413, an auto generated flag 1414, an author user id 1415, a visible to users flag 1416, a start time 1417, an end time 1418 and a review status 1419.

Video table 1430, includes, among other potential fields, a video id 1431 and a duration 1432.

Groups table 1440 may include, among other potential fields, a group id 1441, a group name 1442 and a description 1443.

User table 1450, includes, among other potential fields, a user id 1451a name 1452, an email 1453 and a password 1454.

Label votes table 1460 includes, among other potential fields, a label id 1461, a user id 1462, a video id 1463, a vote value 1464 and a time 1465.

User groups table 1470 includes, among other potential fields, a group id 1471 and a user id 1472.

User reputation table 1480 includes, among other potential fields, a user id 1481, a time at estimation 1482 and a reputation value 1483.

User activity table 1490 includes, among other potential fields, an activity id 1491, a creator id 1492 and a creation time 1493.

Figure 15:
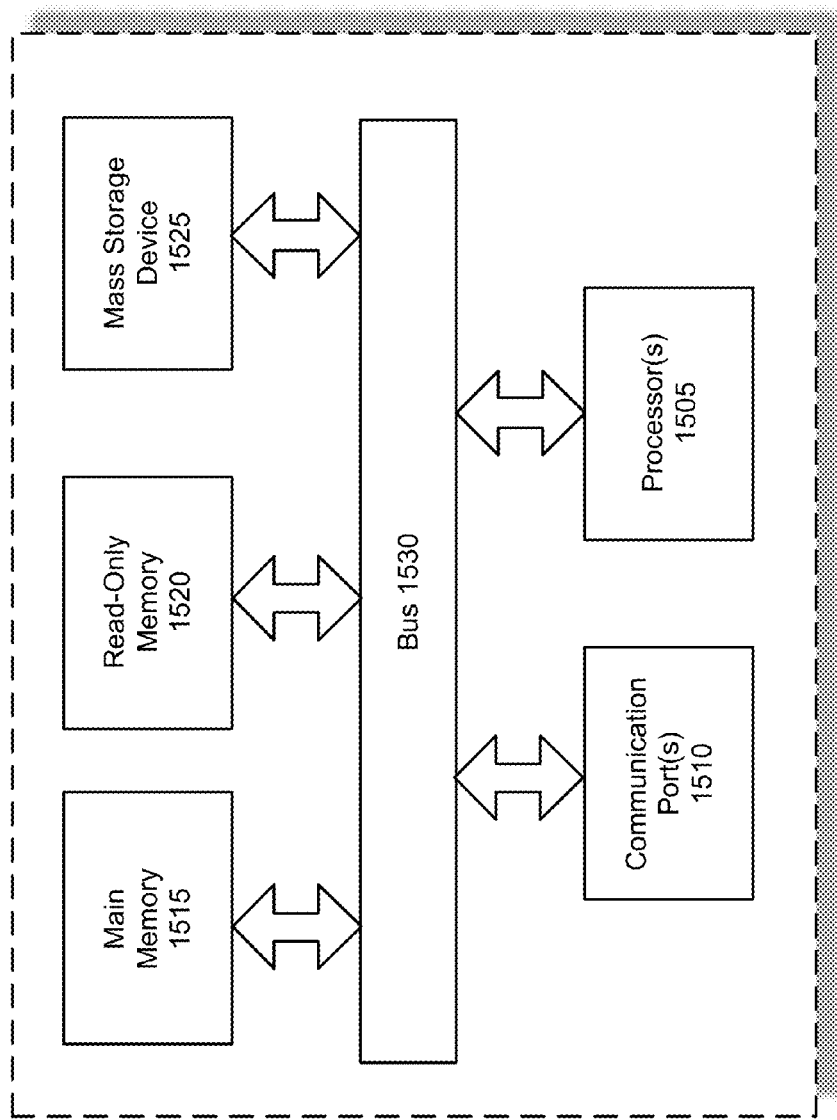
FIG. 15 is an exemplary computer system in which or with which embodiments of the present invention may be utilized.

FIG. 15 is an exemplary computer system 1500 in which or with which embodiments of the present invention may be utilized. Embodiments of the present disclosure include various steps, which have been described above. A variety of these steps may be performed by hardware components or may be tangibly embodied on a non-transitory computer-readable storage medium in the form of machine-executable instructions, which may be used to cause a general-purpose or special-purpose processor programmed with instructions to perform these steps. Alternatively, the steps may be performed by a combination of hardware, software, and/or firmware.

Computer system 1500 may represent or form a part of a client device (e.g., a mobile computing device, a laptop or desktop computer system) or a server device. Computer system 1500 may be part of a distributed computer system (not shown) in which various aspects and functions described herein are practiced. The distributed computer system may include one more additional computer systems (not shown) that exchange information with each other and/or computer system 1500. The computer systems of the distributed computer system may be interconnected by, and may exchange data through, a communication network (not shown), which may include any communication network through which computer systems may exchange data. To exchange data using the communication network, the computer systems and the network may use various methods, protocols and standards, including, among others, Fibre Channel, Token Ring, Ethernet, Wireless Ethernet, Bluetooth, Internet Protocol (IP), IPv6, Transmission Control Protocol (TCP)/IP, User Datagram Protocol (UDP), Delay-Tolerant Networking (DTN), Hypertext Transfer Protocol (HTTP), File Transfer Protocol (FTP), Simple Network Mail Protocl (SNMP), SMS, MMS, Signalling System No. 7 (SS7), JavaScript Object Notation (JSON), Simple Object Access Protocol (SOAP), Common Object Request Broker Architecture (CORBA), REST and Web Services. To ensure data transfer is secure, the computer systems may transmit data via the network using a variety of security measures including, for example, Transport Layer Security (TLS), Secure Sockets Layer (SSL) or a Virtual Private Network (VPN).

Various aspects and functions described herein may be implemented as specialized hardware and/or software components executing in one or more computer systems, such as computer system 1500. There are many examples of computer systems that are currently in use. These examples include, among others, network appliances, personal computers, workstations, mainframes, networked clients, servers, media servers, application servers, database servers and web servers. Other examples of computer systems may include mobile computing devices (e.g., smartphones, tablet computers and personal digital assistants), and network equipment (e.g., load balancers, routers and switches). Further, various aspects and functionality described herein may be located on a single computer system or may be distributed among multiple computer systems connected to one or more communications networks. For example, various aspects and functions may be distributed among one or more server computer systems configured to provide a service to one or more client computers, or to perform an overall task as part of a distributed system. Additionally, aspects may be performed on a client-server or multi-tier system that includes components distributed among one or more server systems that perform various functions. Consequently, the various aspects and functions described herein are not limited to executing on any particular system or group of systems. Further, aspects and functions may be implemented in software, hardware or firmware, or any combination thereof. Thus, aspects and functions may be implemented within methods, acts, systems, system elements and components using a variety of hardware and software configurations, and the various aspects and functions described herein are not limited to any particular distributed architecture, network, or communication protocol.

Computer system 1500 may include a bus 1530, a processor 1505, communication port 1510, a main memory 1515, a removable storage media (not shown), a read only memory (ROM) 1520 and a mass storage device 1525. Those skilled in the art will appreciate that computer system 1500 may include more than one processor and more than on communication port.

To implement at least some of the aspects, functions and processes disclosed herein, processor 1505 performs a series of instructions that result in manipulated data. Processor 1505 may be any type of processor, multiprocessor or controller. Some exemplary processors include commercially available processors such as an Intel Xeon, Itanium, Core, Celeron, or Pentium processor, an AMD Opteron processor, a Sun UltraSPARC or IBM Power5+ processor and an IBM mainframe chip. Processor 1505 is connected to other system components, including one or more memory devices representing main memory 1515, ROM 1520 and mass storage device 1525 via bus 1530.

Main memory 1515 stores programs and data during operation of computer system 1500. Thus, main memory 1515 may be a relatively high performance, volatile, random access memory (e.g., dynamic random access memory (DRAM) or static memory (SRAM)). However, main memory 1515 may include any device for storing data, such as a disk drive or other non-volatile storage device. Various examples may organize main memory 1515 into particularized and, in some cases, unique structures to perform the functions disclosed herein. These data structures may be sized and organized to store values for particular data and types of data.

Components of computer system 1500 are coupled by an interconnection element, such as bus 1530. Bus 1530 may include one or more physical busses, for example, busses between components that are integrated within the same machine, but may include any communication coupling between system elements including specialized or standard computing bus technologies including, but not limited to, Integrated Drive Electronics (IDE), Small Computer System Interface (SCSI), Peripheral Component Interconnect (PCI) and InfiniBand. Bus 1530 enables communications of data and instructions, for example, to be exchanged between system components of computer system 1500.

Computer system 1500 typically also includes one or more interface devices (not shown), e.g., input devices, output devices and combination input/output devices. Interface devices may receive input or provide output. More particularly, output devices may render information for external presentation. Input devices may accept information from external sources. Non-limiting examples of interface devices include keyboards, mouse devices, trackballs, microphones, touch screens, printing devices, display screens, speakers, network interface cards, etc. Interface devices allow computer system 1500 to exchange information and to communicate with external entities, e.g., users and other systems.

Mass storage device 1525 includes a computer readable and writeable nonvolatile, or non-transitory, data storage medium in which instructions are stored that define a program or other object that is executed by processor 1505. Mass storage device 1525 also may include information that is recorded, on or in, the medium, and that is processed by processor 1505 during execution of the program. More specifically, the information may be stored in one or more data structures specifically configured to conserve storage space or increase data exchange performance. The instructions may be persistently stored as encoded signals, and the instructions may cause processor 1505 to perform any of the functions described herein. The medium may, for example, be optical disk, magnetic disk or flash memory, among others. In operation, processor 1505 or some other controller causes data to be read from the nonvolatile recording medium into another memory, such as main memory 1515, that allows for faster access to the information by processor 1505 than does the storage medium included in mass storage device 1525. A variety of components may manage data movement between main memory 1515, mass storage device 1525 and other memory elements and examples are not limited to particular data management components. Further, examples are not limited to a particular memory system or data storage system.

Communication port 1510 may include, but is not limited to, an RS-232 port for use with a modem based dialup connection, a 10/100 Ethernet port, a Gigabit or 10 Gigabit port using copper or fiber, a serial port, a parallel port, or other existing or future ports. Communication port 610 may be chosen depending on a network, such a Local Area Network (LAN), Wide Area Network (WAN), or any network to which computer system 1500 connects.

Removable storage media can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

Although computer system 1505 is shown by way of example as one type of computer system upon which various aspects and functions may be practiced, aspects and functions are not limited to being implemented on computer system 1500. Various aspects and functions may be practiced on one or more computers having a different architecture or components than that shown in FIG. 15. For instance, computer system 1500 may include specially programmed, special-purpose hardware, such as an application-specific integrated circuit (ASIC) tailored to perform a particular operation disclosed herein. While another example may perform the same function using a grid of several general-purpose computing devices running MAC OS System X with Motorola PowerPC processors and several specialized computing devices running proprietary hardware and operating systems.

Computer system 1500 may include an operating system (not shown) that manages at least a portion of the hardware elements included in computer system 1500. In some examples, a processor or controller, such as the processor 1505, executes the operating system. Non-limiting examples of operating systems include a Windows-based operating system, such as, Windows NT, Windows 2000 (Windows ME), Windows XP, Windows Vista or Windows 7 operating systems, available from Microsoft Corporation, a MAC OS System X operating system available from Apple Inc., one of many Linux-based operating system distributions, for example, the Enterprise Linux operating system available from Red Hat Inc., a Solaris operating system available from Sun Microsystems, or a UNIX operating systems available from various sources. Many other operating systems may be used.

Processor 1505 and operating system together define a computer platform for which application programs in high-level programming languages may be written. These applications may be executable, intermediate, bytecode or interpreted code, which communicates over a communication network, for example, the Internet, using a communication protocol, for example, TCP/IP. Similarly, aspects may be implemented using an object-oriented programming language, such as .Net, SmallTalk, Java, C++, Ada, or C# (C-Sharp). Other object-oriented programming languages may also be used. Alternatively, functional, scripting, or logical programming languages may be used.

Additionally, various aspects and functions may be implemented in a non-programmed environment, for example, documents created in Hypertext Markup Language (HTML), eXtensible Markup Language (XML) or other format that, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements, e.g. specialized hardware, executable code, data structures or objects, that are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters and thereby configure the behavior of the components.

Components described above are meant only to exemplify various possibilities. In no way should the aforementioned exemplary computer system limit the scope of the present disclosure.

While embodiments of the invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

What is claimed is:

1. A computer-implemented method comprising:

causing an annotation tool to be presented to a first subscriber of a network-based video discovery and consumption service as video content is being consumed by the first subscriber;

receiving from the first subscriber, by the annotation tool, a first proposed label to be associated with a first portion of the video content;

incorporating the first proposed label within a global table of contents (ToC) for the video content by storing within a database maintained by the network-based video discovery and consumption service and associating with the video content the first proposed label and a start time of the first portion of the video content;

causing the annotation tool to be presented to a second subscriber of the network-based video discovery and consumption service as the video content is being consumed by the second subscriber;

receiving from the second subscriber, by the annotation tool, a second proposed label to be associated with the first portion of the video content or a second portion of the video content;

incorporating the second proposed label within the global ToC by storing within the database and associating with the video content the second proposed label; and responsive to receipt, by a computer system of the network-based video discovery and consumption service, of a request from a third subscriber of the network-based video discovery and consumption service to view the video content, causing to be presented to the third subscriber a customized ToC of the video content comprising a plurality of ToC objects, wherein each ToC object of the plurality of ToC objects represents a user interface element including a label selected for inclusion within the customized ToC from proposed labels within the global ToC in accordance with default filtering criteria or filtering criteria specified by the third subscriber and wherein the plurality of ToC objects include at least one ToC object corresponding to the first proposed label or the second proposed label.

2. The method of claim 1, further comprising responsive to an interaction with the at least one ToC object by the third subscriber, causing the first portion of the video content to presented to the third subscriber by initiating playback of the video content commencing at the start time.

3. The method of claim 1, wherein each of the proposed labels has a weight, wherein the weight is initially computed based on one or more of (i) a net number of votes received for the proposed label from subscribers of the network-based video discovery and consumption service; (ii) a reputation score of a particular subscriber that suggested the proposed label; (iii) a reputation score of a social circle/connections of the particular subscriber; and (iv) the net number of votes weighted in accordance with the reputation scores of the subscribers that cast the votes.

4. The method of claim 3, wherein the method further comprises merging or selecting among the proposed labels through an automated label integration/filtering process.

5. The method of claim 4, wherein the automated label integration/filtering process comprises:
  determining similarity among the proposed labels by calculating an inter-label distance among the proposed labels using one or more of a string similarity measure and a semantic similarity measure; and
  merging together a plurality of similar labels of the proposed labels that have been proposed for various portions of the video content into a single merged label of the plurality of similar labels and setting the weight of the single merged label to a sum of the weights of the plurality of similar labels.

6. The method of claim 4, further comprising determining which of the proposed labels are candidates for inclusion within the customized ToC by performing a label filtering process involving (i) comparing the weight of each of the proposed labels to a predetermined or configurable weight threshold; or (ii) selecting a configurable or predetermined number of the proposed labels based on their respective weights.

7. The method of claim 1, further comprising tracking, by the network-based video discovery and consumption service, a net vote count for each of the proposed labels based on one or more of up votes, down votes, likes and dislikes cast by viewers for the proposed labels.

8. The method of claim 1, further comprising maintaining and periodically recalculating, by the network-based video discovery and consumption service, a reputation score for each of a plurality of subscribers of the network-based video discovery and consumption service, based on one or more of a weighted average of respective label authorship scores, voting history scores and social circle reputation scores for each of the plurality of subscribers.

9. The method of claim 8, wherein a label authorship score for a particular subscriber of the plurality of subscribers is based on an aggregate net vote count for labels proposed by the particular subscriber across all videos available for viewing within the network-based video discovery and consumption service.

10. The method of claim 8, wherein a voting history score for a particular subscriber of the plurality of subscribers is a function of a correlation of types of votes cast by the particular subscriber with types of votes cast by all other subscribers of the network-based video discovery and consumption service in relation to common subject matter.

11. The method of claim 8, wherein a social circle reputation score for a particular subscriber of the plurality of subscribers is based on an aggregate of reputation scores of all other subscribers of the network-based video discovery and consumption service to which the particular subscriber is connected.

12. The method of claim 1, further comprising:
  generating, by an automatic indexing module of the network-based video discovery and consumption service, a third proposed label to be associated with a first portion of the video content or a second portion of the video content;
  incorporating the third proposed label within the global ToC by storing within the database and associating with the video content the third proposed label; and
  wherein the plurality of ToC objects include a second ToC object corresponding to the third proposed label.

13. The method of claim 1, further comprising responsive to receipt by the annotation tool of an indication of a desire on the part of the first subscriber to propose a new label for a portion of the video content in a form of a selection of a time location by the first subscriber within a video timeline presented within the annotation tool and associated with the video content, displaying, by the annotation tool, an automated label placement time suggestion to the first subscriber.

14. The method of claim 13, wherein the automated label placement time suggestion is determined based upon one or more of visual scene boundaries, audio change boundaries, speech change boundaries, closed caption text boundaries and Optical Character Recognition (OCR) boundaries identified within proximity to the selected time location.

15. The method of claim 1, further comprising responsive to receipt by the annotation tool of an indication of a desire on the part of the first subscriber to propose a new label for a portion of the video content in a form of a selection of a time location by the first subscriber within a video timeline presented within the annotation tool and associated with the video content, displaying, by the annotation tool, an automated label content suggestion to the first subscriber based on a cluster of the proposed labels within a predetermined or configurable timespan around the selected time location.

16. A system comprising:
  one or more non-transitory storage devices having embodied therein instructions representing a plurality of modules associated with a network-based video discovery and consumption service;
  one or more processors coupled to the one or more non-transitory storage devices and operable to execute the plurality of modules; and
  wherein the plurality of modules include:
    a client module, which when executed by the one or more processors:

presents a selected video of a plurality of videos concurrently with a corresponding table of contents (ToC) to a user of a plurality of users of the system, wherein the corresponding ToC includes a plurality of existing labels proposed by the plurality of users of the system;

receives proposed labels from the user for clips of video content within the selected video; and receives votes indicating the user's approval or disapproval of the plurality of existing labels; and one or more server modules, which when executed by the one or more processors:

provides the selected video and the corresponding ToC to the user via the client module;

receives the proposed labels and the votes from the user; and updates the corresponding ToC by integrating the proposed labels with the plurality of existing labels.

17. The system of claim 16, where the one or more server modules are further configured to perform automatic integration of user-generated labels by resolving conflicting labels, removing low-rated labels and merging similar labels.

18. The system of claim 16, wherein each of the plurality of existing labels has a weight and wherein said automatic integration comprises:

performing similarity/distance computation among the plurality of existing labels;

merging of similar labels of the plurality of existing labels based results of the similarity/distance computation; and performing a label filtering process based on the weights of the plurality of existing labels; and extracting representative labels for inclusion within the corresponding ToC based on results of the label filtering process.

19. The system of claim 18, wherein the weight is computed based on one or more of (i) a net number of votes received for the existing label from the plurality of users; (ii) a reputation score of a particular user of the plurality of users that suggested the existing label; and (iii) a reputation score of a social circle/connections of the particular user.

20. The system according to claim 16, wherein the one or more server modules are further configured to receive proposed labels from an automatic indexing module.

21. The system according to claim 20, wherein the one or more server modules are further configured to integrate the proposed labels received from the automatic indexing module with user-generated labels into a single ToC and index per video of the plurality of videos.

22. One or more non-transitory computer-readable storage media embodying a set of instructions, which when executed by one or more processors of one or more computer systems, cause the one or more processors to perform a method comprising:

causing an annotation tool to be presented to a first subscriber of a network-based video discovery and consumption service as video content is being consumed by the first subscriber;

receiving from the first subscriber, by the annotation tool, a first proposed label to be associated with a first portion of the video content;

incorporating the first proposed label within a global table of contents (ToC) for the video content by storing within a database maintained by the network-based video discovery and consumption service and associating with the video content the first proposed label and a start time of the first portion of the video content;

causing the annotation tool to be presented to a second subscriber of the network-based video discovery and consumption service as the video content is being consumed by the second subscriber;

receiving from the second subscriber, by the annotation tool, a second proposed label to be associated with the first portion of the video content or a second portion of the video content;

incorporating the second proposed label within the global ToC by storing within the database and associating with the video content the second proposed label; and responsive to receipt by the network-based video discovery and consumption service of a request from a third subscriber of the network-based video discovery and consumption service to view the video content, causing to be presented to the third subscriber a customized ToC of the video content comprising a plurality of ToC objects, wherein each ToC object of the plurality of ToC objects represents a user interface element including a label selected for inclusion within the customized ToC from proposed labels within the global ToC in accordance with default filtering criteria or filtering criteria specified by the third subscriber and wherein the plurality of ToC objects include at least one ToC object corresponding to the first proposed label or the second proposed label.

23. The one or more non-transitory computer-readable storage media of claim 22, wherein the method further comprises responsive to an interaction with the at least one ToC object by the third subscriber, causing the first portion of the video content to presented to the third subscriber by initiating playback of the video content commencing at the start time.

24. The one or more non-transitory computer-readable storage media of claim 22, wherein each of the proposed labels has a weight, wherein the weight is initially computed based on one or more of (i) a net number of votes received for the proposed label from subscribers of the network-based video discovery and consumption service; (ii) a reputation score of a particular subscriber that suggested the proposed label; (iii) a reputation score of a social circle/connections of the particular subscriber; and (iv) the net number of votes weighted in accordance with the reputation scores of the subscribers that cast the votes.

25. The one or more non-transitory computer-readable storage media of claim 24, wherein the method further comprises merging or selecting among the proposed labels through an automated label integration/filtering process.

26. The one or more non-transitory computer-readable storage media of claim 25, wherein the automated label integration/filtering process comprises:

determining similarity among the proposed labels by calculating an inter-label distance among the proposed labels using one or more of a string similarity measure and a semantic similarity measure; and merging together a plurality of similar labels of the proposed labels that have been proposed for various portions of the video content into a single merged label of the plurality of similar labels and setting the weight of the single merged label to a sum of the weights of the plurality of similar labels.

27. The one or more non-transitory computer-readable storage media of claim 25, wherein the method further comprises determining which of the proposed labels are candidates for inclusion within the customized ToC by performing a label filtering process involving comparing the weight of each of the proposed labels to a predetermined or configurable weight threshold.

28. The one or more non-transitory computer-readable storage media of claim 22, wherein the method further comprises tracking a net vote count for each of the proposed labels based on one or more of up votes, down votes, likes and dislikes cast by viewers for the proposed labels.

29. The one or more non-transitory computer-readable storage media of claim 22, wherein the method further comprises maintaining a reputation score for each of a plurality of subscribers of the network-based video discovery and consumption service based on one or more of a weighted average of respective label authorship scores, voting history scores and social circle reputation scores for each of the plurality of subscribers.

30. The one or more non-transitory computer-readable storage media of claim 22, wherein the method further comprises:
   generating, by an automatic indexing module of the network-based video discovery and consumption service, a third proposed label to be associated with a first portion of the video content or a second portion of the video content; and
   incorporating the third proposed label within the global ToC by storing within the database and associating with the video content the third proposed label.

31. The one or more non-transitory computer-readable storage media of claim 22, wherein the method further comprises responsive to receipt by the annotation tool of an indication of a desire on the part of the first subscriber to propose a new label for a portion of the video content in a form of a selection of a time location by the first subscriber within a video timeline presented within the annotation tool and associated with the video content, displaying, by the annotation tool, an automated label placement time suggestion to the first subscriber.

32. The one or more non-transitory computer-readable storage media of claim 31, wherein the automated label placement time suggestion is determined based upon one or more of visual scene boundaries, audio change boundaries, speech change boundaries, closed caption text boundaries and Optical Character Recognition (OCR) boundaries identified within proximity to the selected time location.

33. The one or more non-transitory computer-readable storage media of claim 22, wherein the method further comprises responsive to receipt by the annotation tool of an indication of a desire on the part of the first subscriber to propose a new label for a portion of the video content in a form of a selection of a time location by the first subscriber within a video timeline presented within the annotation tool and associated with the video content, displaying, by the annotation tool, an automated label content suggestion to the first subscriber based on a cluster of the proposed labels within a predetermined or configurable timespan around the selected time location.

* * * * *